US012531028B2

(12) United States Patent
Kim et al.

(10) Patent No.: US 12,531,028 B2
(45) Date of Patent: Jan. 20, 2026

(54) DISPLAY PANEL HAVING IMPROVED LIGHT EMISSION EFFICIENCY

(71) Applicant: Samsung Display Co., LTD., Yongin-si (KR)

(72) Inventors: Hyeonsik Kim, Yongin-si (KR); Heewoon Im, Yongin-si (KR); Yoolguk Kim, Yongin-si (KR); Jiyoon Kim, Yongin-si (KR); Jae-Hyun Park, Yongin-si (KR); Jinwoo Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/223,297

(22) Filed: Jul. 18, 2023

(65) Prior Publication Data

US 2024/0096284 A1 Mar. 21, 2024

(30) Foreign Application Priority Data

Sep. 16, 2022 (KR) ........................ 10-2022-0116888

(51) Int. Cl.
*G09G 3/3258* (2016.01)

(52) U.S. Cl.
CPC ... *G09G 3/3258* (2013.01); *G09G 2300/0426* (2013.01)

(58) Field of Classification Search
CPC .... G09G 3/30–3291; G09G 2300/0421–0426; G09G 2300/0439; G09G 2300/0465; G09G 2300/0876; H10K 59/12–1315
See application file for complete search history.

(56) References Cited

U.S. PATENT DOCUMENTS

| | | | | |
|---|---|---|---|---|
| 10,783,830 | B1 * | 9/2020 | Lu | G09G 3/3258 |
| 11,063,070 | B2 | 7/2021 | Zhang et al. | |
| 11,515,375 | B2 | 11/2022 | Zhang | |
| 2007/0152920 | A1 * | 7/2007 | Yamashita | G09G 3/3233 345/76 |
| 2015/0179724 | A1 * | 6/2015 | Lee | H10K 59/10 438/23 |
| 2018/0183008 | A1 * | 6/2018 | Song | H10K 59/121 |
| 2019/0304365 | A1 * | 10/2019 | Hyun | G09G 3/3233 |
| 2021/0126065 | A1 | 4/2021 | Kwon et al. | |
| 2022/0173174 | A1 | 6/2022 | Hatsumi et al. | |
| 2022/0173192 | A1 * | 6/2022 | Wang | H10K 59/1216 |
| 2023/0371343 | A1 * | 11/2023 | Kida | G09F 9/00 |

FOREIGN PATENT DOCUMENTS

| | | | |
|---|---|---|---|
| KR | 1020200076191 | A | 6/2020 |
| KR | 1020210052650 | A | 5/2021 |
| WO | 2020165686 | A1 | 8/2020 |

* cited by examiner

*Primary Examiner* — Roberto W Flores
(74) *Attorney, Agent, or Firm* — CANTOR COLBURN LLP

(57) ABSTRACT

A display panel includes: first and second pixel circuits each including a transistor and a capacitor, and first and second light emitting elements electrically connected to the first and second pixel circuits, respectively. The first light emitting element is spaced apart from the capacitors of the first and second pixel circuits in a plan view, and the second light emitting device overlaps the capacitors of the first and second pixel circuits in the plan view.

7 Claims, 13 Drawing Sheets

DISPLAY PANEL HAVING IMPROVED LIGHT EMISSION EFFICIENCY

This application claims priority to Korean Patent Application No. 10-2022-0116888, filed on Sep. 16, 2022, and all the benefits accruing therefrom under 35 U.S.C. § 119, the content of which in its entirety is herein incorporated by reference.

BACKGROUND

The present disclosure herein relates to a display panel, and more particularly, to a display panel with improved light emission efficiency.

Multimedia apparatuses such as televisions, mobile phones, tablet PCs computers, navigation devices, game machines, and the like may be provided with a display panel for displaying an image. The display panel includes a light emitting element and a driving circuit for driving the light emitting element. The light emitting element of the display panel emits light and generates an image according to a voltage applied from the driving circuit. Researches about arrangement of light emitting elements and driving circuits for improving light emission efficiency of the light emitting elements are carried out.

SUMMARY

The present disclosure provides a display panel with improved light emission efficiency by reducing a difference of light emission efficiency between light emitting elements according to color of output light.

An embodiment of the invention provides a display panel including: first and second pixel circuits each including a transistor and a capacitor; and first and second light emitting elements electrically connected to the first and second pixel circuits, respectively. The first light emitting element is arranged spaced apart from the capacitors of the first and second pixel circuits in a plan view, and the second light emitting element is arranged overlapping the capacitors of the first and second pixel circuits in the plan view.

In an embodiment, the capacitor may include a first capacitor formed by a first capacitor electrode and a second capacitor electrode, which overlap each other, and the second light emitting element may overlap the first capacitor electrode and the second capacitor electrode in the plan view.

In an embodiment, the capacitor may further include a second capacitor formed by the second capacitor electrode and a third capacitor electrode, which overlap each other, and the second light emitting element may overlap the third capacitor electrode in the plan view.

In an embodiment, the transistor of the first pixel circuit may include a connection transistor connected to the first light emitting element, and the first light emitting element may overlap the connection transistor of the first pixel circuit in the plan view.

In an embodiment, the transistor of the second pixel circuit may include a connection transistor connected to the second light emitting element, and the second light emitting element may be spaced apart from the connection transistor of the second pixel circuit in the plan view.

In an embodiment, the transistor of the first pixel circuit may include a connection transistor connected to the first light emitting element, and the first light emitting element may be spaced apart from the connection transistor of the first pixel circuit in the plan view.

In an embodiment, the first pixel circuit and the second pixel circuit may be arranged along a first direction, and the first light emitting element and the second light emitting element may be arranged along a second direction intersecting the first direction.

In an embodiment, the first light emitting element may emit a first color light and the second light emitting element may emit a second color light, and a wavelength range of the second color light may be less than a wavelength range of the first color light.

In an embodiment, the first light emitting element may include: a cathode electrically connected to the first pixel circuit; an anode electrically connected to a first power supply voltage line; and an emission part disposed between the cathode and the anode. In an embodiment, the transistor of the first pixel circuit may include a first transistor and a second transistor. In an embodiment, the first transistor may include a first gate electrode and a first semiconductor pattern electrically connected to the cathode of the first light emitting element and a second power supply voltage line, and the second transistor may include a second gate electrode and a second semiconductor pattern electrically connected to the first gate electrode and a data line.

In an embodiment, the capacitor may include a first capacitor formed by a first capacitor electrode and a second capacitor electrode which overlap each other, and the first capacitor electrode may be electrically connected to the first gate electrode, and the second capacitor electrode may be electrically connected to the first semiconductor pattern.

In an embodiment, the first light emitting element may overlap the first transistor in the plan view without overlapping the first and second capacitor electrodes.

In an embodiment, the transistor of the first pixel circuit may further include third to eighth transistors. In an embodiment, the third transistor may include a third gate electrode and a third semiconductor pattern electrically connected to the second semiconductor pattern and a reference voltage line. In an embodiment, the fourth transistor may include a fourth gate electrode and a fourth semiconductor pattern electrically connected to the second capacitor electrode and a first initialization voltage line. In an embodiment, the fifth transistor may include a fifth gate electrode and a fifth semiconductor pattern electrically connected to the first semiconductor pattern and a second initialization voltage line. In an embodiment, the sixth transistor may include a sixth gate electrode and a sixth semiconductor pattern electrically connected to the cathode and the first semiconductor pattern. In an embodiment, the seventh transistor may include a seventh gate electrode and a seventh semiconductor pattern electrically connected to the first semiconductor pattern and the second power supply voltage line. In an embodiment, the eighth transistor may include an eighth gate electrode electrically connected to the fifth gate electrode and an eighth semiconductor pattern electrically connected to the fifth semiconductor pattern and the sixth semiconductor pattern.

In an embodiment, the capacitor may further include a second capacitor formed by the second capacitor electrode and a third capacitor electrode which overlap each other, and the second capacitor electrode may be electrically connected to the seventh semiconductor pattern, and the third capacitor electrode may be electrically connected to the second power supply voltage line.

In an embodiment, the first light emitting element may overlap the sixth transistor in the plan view without overlapping the first to third capacitor electrodes.

In an embodiment of the invention, a display panel includes first to third pixels, which emit different color lights from each other, and each of which includes a pixel circuit and a light emitting element. In an embodiment, the pixel circuit may include: a connection transistor electrically connected to the light emitting element; a first capacitor formed by a first capacitor electrode and a second capacitor electrode which overlap each other; and a second capacitor formed by the second capacitor electrode and a third capacitor electrode which overlap each other. The light emitting elements of the first and second pixels is spaced apart from the first to third capacitor electrodes of the first to third pixels in a plan view, and the light emitting element of the third pixel may overlap the first to third capacitor electrodes of the first to third pixels in the plan view.

In an embodiment, the pixel circuits of the first to third pixels may be arranged along a first direction, and the light emitting elements of the first to third pixels may be arranged along a second direction intersecting the first direction.

In an embodiment, the pixel circuits of the first to third pixels may be arranged along a first direction, the light emitting elements of the first and second pixels may be arranged along the first direction, and the light emitting element of the third pixel may be arranged with the light emitting elements of the first and second pixels along a second direction intersecting the first direction.

In an embodiment, the first to third pixels may emit red light, green light, and blue light, respectively.

In an embodiment, the light emitting element of each of the first to third pixels may include a cathode, an emission part, and an anode which are sequentially arranged along a major direction of light emission.

In an embodiment, the connection transistor of each of the first to third pixels may include: a semiconductor pattern including a source, a drain, and a channel; and a gate electrode disposed on the semiconductor pattern. In an embodiment, the second capacitor electrode of a corresponding pixel of the first to third pixels may be disposed in the same layer as the gate electrode, the first capacitor electrode of the corresponding pixel may be disposed under the second capacitor electrode of the corresponding pixel, and the third capacitor electrode of the corresponding pixel may be disposed on the second capacitor electrode of the corresponding pixel.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1:
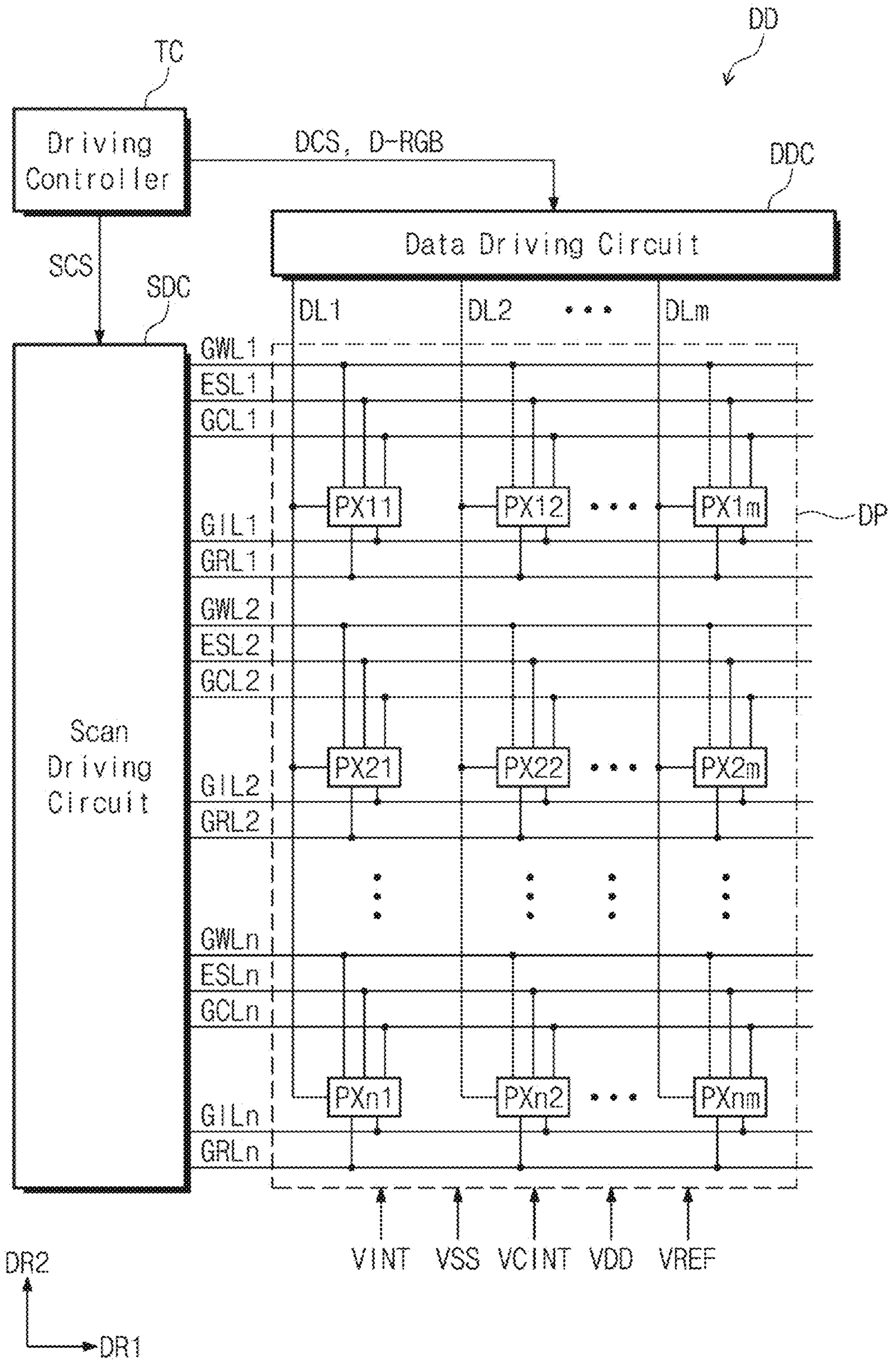
FIG. 1 is a block diagram illustrating a display device according to an embodiment of the invention.

Embodiments of the invention may be variously modified and may include various modes. However, particular embodiments are illustrated in the drawings and are described in detail below. However, it should be understood that the present disclosure is not limited to specific forms, but rather cover all modifications, equivalents or alternatives that fall within the spirit and scope of the present disclosure.

It will be understood that when an element (or a region, layer, portion, or the like) is referred to as being "on", "connected to", or "coupled to" another element, it can be directly on or directly connected/coupled to the other element, or a third element may be present therebetween.

The same reference numerals refer to the same elements. In the drawings, the thicknesses, ratios, and dimensions of elements are exaggerated for clarity of illustration. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any combinations that can be defined by associated elements.

The terms "first", "second" and the like may be used for describing various elements, but the elements should not be construed as being limited by the terms. Such terms are only used for distinguishing one element from other elements. For example, a first element could be termed a second element and vice versa without departing from the scope of the right of the present invention. The terms of a singular form may include plural forms unless otherwise specified.

Furthermore, the terms "under", "lower side", "on", "upper side", and like are used to describe association relationships among elements illustrated in the drawings. The terms, which are relative concepts, are used on the basis of directions illustrated in the drawings.

It will be further understood that the terms "include", "including", "has", "having", and the like, when used in this specification, specify the presence of stated features, numbers, steps, operations, elements, components, or combinations thereof, but do not preclude the presence or addition of one or more other features, numbers, steps, operations, elements, components, or combinations thereof.

All of the terms used herein (including technical and scientific terms) have the same meanings as understood by those skilled in the art, unless otherwise defined. Terms in common usage such as those defined in commonly used dictionaries should be interpreted to contextually match the lexical meanings in the relevant art, and should not be interpreted in an idealized or overly formal sense unless otherwise defined explicitly.

Hereinafter, a display apparatus and a display panel according to an embodiment of the invention will be described with reference to the accompanying drawings.

FIG. 1 is a block diagram illustrating a display apparatus DD according to an embodiment of the invention.

The display apparatus DD may be an apparatus which is activated and displays an image according to an electric signal. For example, the display apparatus DD may include a large-size apparatus such as a television, an outdoor advertising board, and the like and a small or medium-size apparatus such as a monitor, a mobile phone, a tablet computer, a navigation device, a game machine, and the like. The above examples of the display apparatus DD are merely illustrative, and the display apparatus DD is not limited to any one of the examples unless it deviates from the invention.

Referring to FIG. 1, the display apparatus DD may include a driving controller TC, a scan driving circuit SDC, a data driving circuit DDC, and a display panel DP.

The display panel DP may display an image according to an electric signal. The display panel DP according to an embodiment of the invention may be an emissive display panel, and is not particularly limited. For example, the display panel DP may be an organic light-emitting display panel, an inorganic light-emitting display panel, or a quantum dot light-emitting display panel. An emission layer (or a light emitting layer) of the organic light-emitting display panel may include an organic light-emitting material, and an emission layer of the inorganic light-emitting display panel may include an inorganic light-emitting material. An emission layer of the quantum dot light-emitting display panel may include quantum dots, quantum rods, etc. Hereinafter, the display panel DP will be described as an organic light-emitting display panel.

The driving controller TC may receive input image signals, and may generate pieces of image data D-RGB by converting a data format of the input image signals so that the input image signals are compatible with a specification of an interface with the data driving circuit DDC. The driving controller TC may output the pieces of image data D-RGB and various control signals DCS and SCS.

The scan driving circuit SDC may receive a scan control signal SCS from the driving controller TC. The scan control signal SCS may include a vertical initiation signal for initiating operation of the scan driving circuit SDC and a clock signal for determining output time of signals.

The scan driving circuit SDC may generate scan signals in response to the scan control signal SCS. The scan signals may be sequentially output to scan lines GWL1 to GWLn, GCL1 to GCLn, GIL1 to GILn, and GRL1 to GRLn. Furthermore, the scan driving circuit SDC may generate emission control signals in response to the scan control signal SCS, and the emission control signals may be output to emission control lines ESL1 to ESLn.

Although FIG. 1 illustrates the scan signals and the emission control signals as being output from one scan driving circuit SDC, an embodiment of the invention is not limited thereto. In an embodiment, the scan driving circuit SDC may separately output the scan signals, and may separately output the emission control signals. In an embodiment, a driving circuit for generating and outputting the scan signals may be separate from a driving circuit for generating and outputting the emission control signals.

The data driving circuit DDC may receive the data control signal DCS and the pieces of image data D-RGB from the driving controller TC. The data driving circuit DDC may convert the pieces of image data D-RGB into data signals, and may output the data signals to data lines DL1 to DLm. The data signals may be analog signals corresponding to gradation values of the pieces of image data D-RGB.

The display panel DP may include the scan lines GWL1 to GWLn, GCL1 to GCLn, GIL1 to GILn, and GRL1 to GRLn, the emission control lines ESL1 to ESLn, the data lines DL1 to DLm, and pixels PX11 to PXnm.

The scan lines GWL1 to GWLn, GCL1 to GCLn, GIL1 to GILn, and GRL1 to GRLn may extend in a first direction DR1 and may be arranged in a second direction DR2 intersecting the first direction DR1. The scan lines GWL1 to GWLn, GCL1 to GCLn, GIL1 to GILn, and GRL1 to GRLn may include data scan lines GWL1 to GWLn, compensation scan lines GCL1 to GCLn, initialization scan lines GIL1 to GILn, and reset scan lines GRL1 to GRLn. The emission control lines ESL1 to ESLn each may be arranged in parallel with the scan lines GWL1 to GWLn, GCL1 to GCLn, GIL1 to GILn, and GRL1 to GRLn.

The data lines DL1 to DLm may be insulated from and intersect the scan lines GWL1 to GWLn, GCL1 to GCLn, GIL1 to GILn, and GRL1 to GRLn. For example, the data lines DL1 to DLm may extend in the second direction DR2 and may be arranged in the first direction DR1.

The pixels PX11 to PXnm each may be connected to a corresponding scan line among the scan lines GWL1 to GWLn, GCL1 to GCLn, GIL1 to GILn, and GRL1 to GRLn, a corresponding emission control line among the emission control lines ESL1 to ESLn, and a corresponding data line among the data lines DL1 to DLm.

The pixels PX11 to PXnm each may receive voltages VDD, VSS, VINT, VCINT, and VREF for driving pixels. The voltages VDD, VSS, VINT, VCINT, and VREF may include a first power supply voltage VDD, a second power supply voltage VSS, an initialization voltage VINT, a compensation initialization voltage VCINT, and a reference voltage VREF. However, the types of voltages received by the pixels PX11 to PXnm are not limited thereto, and may be changed according to a configuration of a driving pixel of the pixels PX11 to PXnm.

The pixels PX11 to PXnm each may include a light emitting element and a pixel driving circuit for driving the light emitting element. The pixel driving circuit may include at least one transistor and at least one capacitor. The light emitting element and the pixel driving circuit will be described in more detail.

In the present embodiment, at least one of the scan driving circuit SDC or the data driving circuit DDC may include transistors formed through the same process as the pixel driving circuit. For example, the scan driving circuit SDC and the data driving circuit DDC both may be mounted on the display panel DP. However, an embodiment of the invention is not limited thereto, and one of the scan driving circuit SDC and the data driving circuit DDC may be mounted on the display panel DP, and the other may be provided to an additional circuit board that is independent of the display panel DP and may be connected to the display panel DP.

Figure 2:
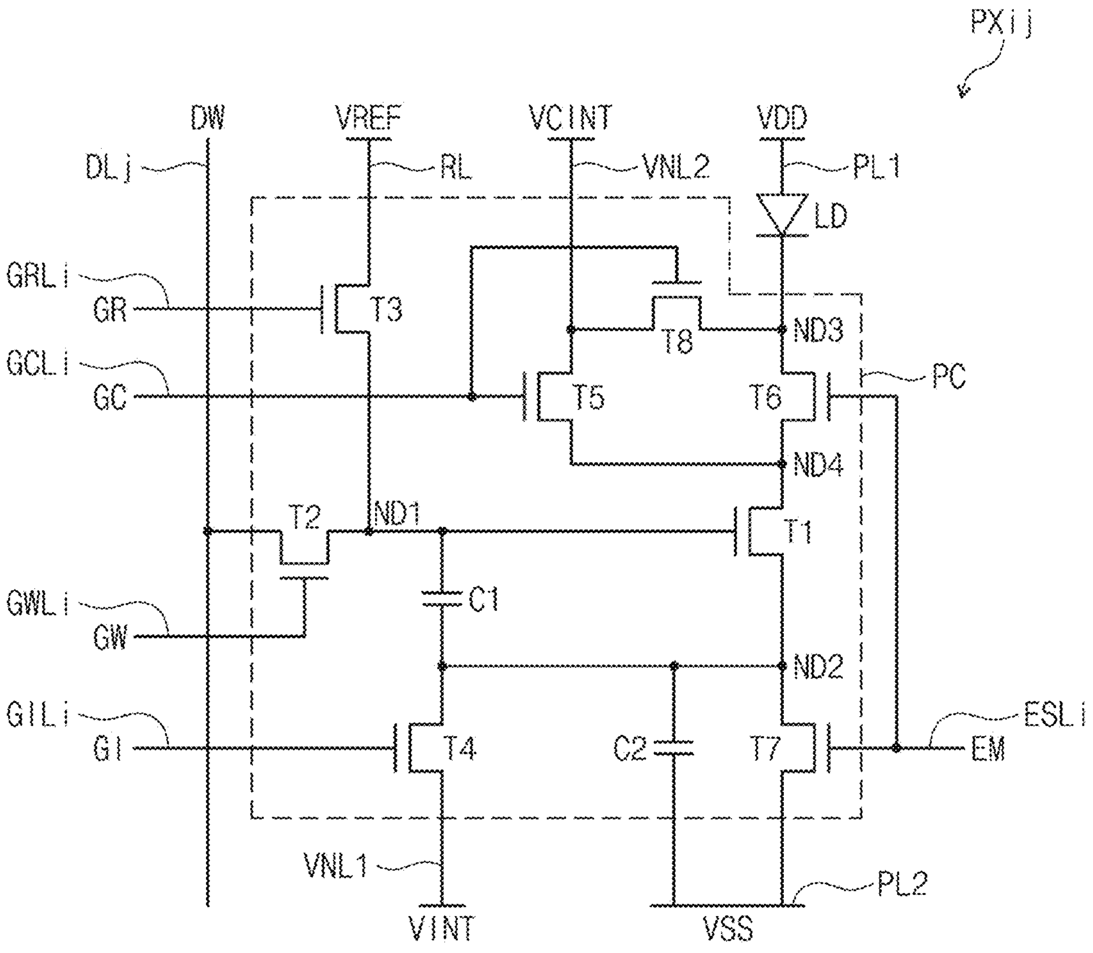
FIG. 2 is an equivalent circuit diagram of a pixel according to an embodiment of the invention.

FIG. 2 is an equivalent circuit diagram of a pixel PXij according to an embodiment of the invention. FIG. 2 illustrates an equivalent circuit diagram of one pixel PXij connected to a j-th data line DLj among the pixel PX11 to PXnm, and descriptions thereof may also apply to the other pixels PX11 to PXnm.

Referring to FIG. 2, the pixel PXij may be connected to the j-th data line DLj among the data lines DL1 to DLm (see FIG. 1), an i-th data scan line GWLi among the data scan lines GWL1 to GWLn (see FIG. 1), an i-th compensation scan line GCLi among the compensation scan lines GCL1 to GCLn (see FIG. 1), an i-th initialization scan line GILi among the initialization scan lines GIL1 to GILn (see FIG. 1), an i-th reset scan line GRLi among the reset scan lines GRL1 to GRLn (see FIG. 1), and an i-th emission control line ESLi among the emission control lines ESL1 to ESLn (see FIG. 1). Here, i and j are natural numbers.

The pixel PXij may include a light emitting element LD and a pixel driving circuit PC. Hereinafter, the pixel driving circuit PC is referred to as a pixel circuit PC. In an embodiment, the light emitting element LD may be a light emitting diode, and may be an organic light emitting diode including an organic light emitting layer. The light emitting element LD may be connected to the pixel circuit PC, and the pixel circuit PC may control an amount of current flowing to the light emitting element LD. The light emitting element LD may generate light having predetermined luminance according to an amount of current provided from the pixel circuit PC.

The pixel circuit PC may be electrically connected to the scan lines GWLi, GCLi, GILi, GRLi, the data line DLj, the emission control line ESLi, and voltage lines PL1, PL2, VNL1, VNL2, and RL.

The pixel circuit PC may include first to eighth transistors T1 to T8, a first capacitor C1, and a second capacitor C2. Each of the first to eighth transistors T1 to T8 may be a transistor having an oxide semiconductor layer or a transistor having a low-temperatures polycrystalline silicon ("LTPS") semiconductor layer. Furthermore, each of the first to eighth transistors T1 to T8 may be a P-type transistor or N-type transistor. In the present embodiment, the first to eighth transistors T1 to T8 are all described as an N-type transistor having an oxide semiconductor layer, but an embodiment of the invention is not limited thereto.

The first to eighth transistors T1 to T8 each may include a gate, a source, and a drain. In the present disclosure, "electrically connecting (or joining) between a transistor and a signal line or between a transistor and another transistor" represents that "an electrode of a transistor has an integrated form with a signal line or is connected thereto via a connection electrode".

The first transistor T1 may be electrically connected between a second power supply voltage line PL2 receiving the second power supply voltage VSS and the light emitting element LD. For example, the first transistor T1 may be electrically connected to the second power supply voltage line PL2 via the seventh transistor T7 and electrically connected to the light emitting element LD via the sixth transistor T6. The first transistor T1 may include a gate connected to a first node ND1, a source connected to a second node ND2, and a drain connected to a fourth node ND4.

The second transistor T2 may be connected between the data line DLj and the first transistor T1. The second transistor T2 may include a gate connected to the data scan line GWLi, a drain connected to the data line DLj, and a source connected to the first node ND1.

The second transistor T2 may drive the first transistor T1 by providing a data signal DW to the first node ND1 in response to a scan signal GW transferred through the data scan line GWLi. The first transistor T1 may receive the data signal DW according to a switching operation of the second transistor T2 to supply a driving current to the light emitting element LD. In the present embodiment, the first transistor T1 may be defined as a driving transistor, and the second transistor T2 may be defined as a switching transistor.

The third transistor T3 may include a gate connected to the reset scan line GRLi, a drain connected to a reference voltage line RL, and a source connected to the first node ND1. The reference voltage line RL may receive the reference voltage VREF, and the third transistor T3 may provide the reference voltage VREF to the first node ND1 in response to a reset scan signal GR transferred through the reset scan line GRLi.

The fourth transistor T4 may include a gate connected to the initialization scan line GILi, a drain connected to a first initialization voltage line VNL1, and a source connected to the second node ND2. The first initialization voltage line VNL1 may receive the initialization voltage VINT, and the fourth transistor T4 may provide the initialization voltage VINT to the second node ND2 in response to an initialization scan signal GI transferred through the initialization scan line GILL In the present embodiment, the fourth transistor T4 may be defined as an initialization transistor.

The fifth transistor T5 may include a gate connected to the compensation scan line GCLi, a source connected to the fourth node ND4, and a drain connected to a second initialization voltage line VNL2. The second initialization voltage line VNL2 may receive the compensation initialization voltage VCINT, and the fifth transistor T5 may provide the compensation initialization voltage VCINT to the fourth node ND4 in response to a compensation scan signal GC transferred through the compensation scan line GCLi. The compensation initialization voltage VCINT may have a voltage level different from a voltage level of the initialization voltage VINT.

The sixth transistor T6 may include a gate connected to the emission control line ESLi, a drain connected to a third node ND3, and a source connected to the fourth node ND4. The third node ND3 may correspond to a connection portion in which a cathode of the light emitting element LD and the pixel circuit PC are connected. The sixth transistor T6 may electrically connect the fourth node ND4 and the cathode of the light emitting element LD in response to an emission control signal EM transferred through the emission control line ESLi.

The seventh transistor T7 may include a gate connected to the emission control line ESLi, a source connected to the second power supply voltage line PL2, and a drain connected to the second node ND2. The seventh transistor T7 may provide the second power supply voltage VSS to the second node ND2 in response to the emission control signal EM. Here, the seventh transistor T7 may be turned on/off simultaneously with the sixth transistor T6. The gate of the seventh transistor T7 is not limited to being connected to the emission control line ESLi, and may receive the emission control signal EM through another line. In the present embodiment, the sixth transistor T6 and the seventh transistor T7 may be defined as an emission control transistor.

The eighth transistor T8 may include a gate connected to the compensation scan line GCLi, a drain connected to the second initialization voltage line VNL2, and a source connected to the third node ND3. The eighth transistor T8 may supply the compensation initialization voltage VCINT to the cathode of the light emitting element LD in response to the compensation scan signal GC transferred through the compensation scan line GCLi. The fifth transistor T5 and the eighth transistor T8 are turned on/off by the compensation scan signal GC, and thus may be simultaneously turned on/off. In the present embodiment, the fifth transistor T5 and the eighth transistor T8 may be defined as a compensation initialization transistor.

The fifth transistor T5 and the eighth transistor T8 may be turned on by the compensation scan signal GC so as to provide the compensation initialization voltage VCINT to each of the third node ND3 and the fourth node ND4. The compensation initialization voltage VCINT transferred to the fourth node ND4 may compensate a threshold voltage of the first transistor T1. Furthermore, the compensation initialization voltage VCINT transferred to the third node ND3 may initialize the cathode of the light emitting element LD. For example, potential of the third node ND3 may be periodically initialized by the compensation initialization voltage VCINT through the eighth transistor T8.

However, this is merely illustrative, and the eighth transistor T8 and the fifth transistor T5 may be independently driven by different scan signals and may transfer different voltage, and are not limited to any one embodiment.

The first capacitor C1 may include an electrode connected to the first node ND1 and an electrode connected to the second node ND2. The first capacitor C1 may store a potential difference between the gate of the first transistor T1 and the source of the first transistor T1. The first capacitor C1 may be charged/discharged according to the data signal DW transferred to the first node ND1. In the present embodiment, the first capacitor C1 may be defined as a storage capacitor.

The second capacitor C2 may include an electrode connected to the second node ND2 and an electrode connected to the second power supply voltage PL2. The second capacitor C2 may maintain a potential difference between the source and drain of the seventh transistor T7. Furthermore, when the light emitting element LD is electrically connected to the second node ND2 and the second power supply voltage line PL2, the second capacitor C2 may maintain a potential difference between the cathode and anode of the light emitting element LD, and thus the pixel circuit PC may be stably driven even if the light emitting device LD is connected to a position other than the second node ND2. In the present embodiment, the second capacitor C2 may be defined as a maintaining capacitor.

The light emitting element LD according to an embodiment of the invention may have an inverted organic light emitting diode ("OLED") structure. That is, the light emitting element LD may be connected to the pixel circuit PC through the cathode. In detail, the light emitting element LD may include an anode connected to the first power supply voltage line PL1, a cathode opposing the anode and connected to the third node ND3, and an emission layer arranged between the anode and the cathode. The light emitting element LD may emit light by activating excitons by flowing current through the emission layer, the current being generated through a difference between a cathode voltage (i.e., potential of the third node ND3) and the first power supply voltage VDD transferred through the first power supply voltage line PL1.

According to the present embodiment, the anode of the light emitting element LD may be connected to the first power supply voltage line PL1 to receive the first power supply voltage VDD that is a constant voltage, and the cathode may be electrically connected to the first transistor T1 via the sixth transistor T6 to receive the cathode voltage. Accordingly, influence of characteristics of the light emitting element LD on the potential of the second node ND2 connected to the first transistor T1 may reduce. Therefore, even if the characteristics of the light emitting element LD deteriorate due to a lifespan of the light emitting element LD, the influence of the characteristics of the light emitting element LD on characteristics of transistors constituting the pixel circuit PC, particularly, a transistor connected to the third node (ND3) (e.g., sixth transistor T6) may reduce, and the potential of the second node ND2 may also be stabilized regardless of characteristics deterioration of the light emitting element LD. Therefore, the pixel circuit PC may be stably driven, and occurrence of a display defect such as afterimage or the like may reduce.

The pixel circuit PC illustrated in FIG. 2 is illustrative, and the number of and connection relationship between transistors and capacitors constituting the pixel circuit PC according to an embodiment of the invention may be variously designed provided that the pixel circuit PC and the cathode of the light emitting element LD are connected, and are not limited to any one embodiment.

Figure 3:
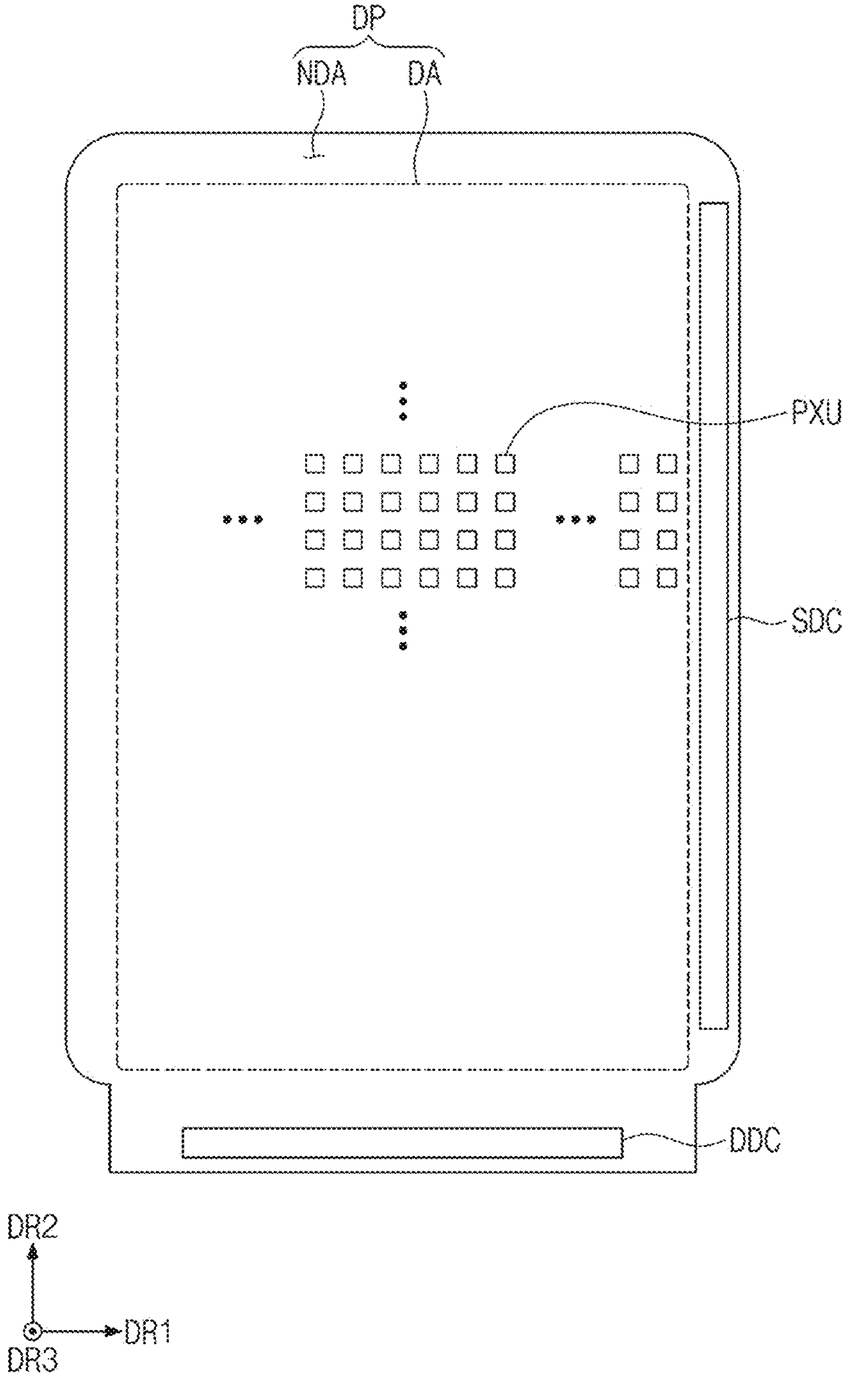
FIG. 3 is a plan view illustrating a display panel according to an embodiment of the invention.

FIG. 3 is a plan view illustrating the display panel DP according to an embodiment of the invention. FIG. 3 schematically illustrates some elements of the display panel DP.

In the present embodiment, a third direction DR3 may be defined as a direction perpendicular to a plane defined by the first direction DR1 and the second direction DR2. A front surface (or upper surface) and a rear surface (or lower surface) of each of members constituting the display panel DP may oppose each other in the third direction DR3, and a normal direction of each of the front surface and the rear surface may substantially parallel with the third direction DR3. A separation distance between the front surface and the rear surface defined according to the third direction DR3 may correspond to a thickness of a member.

Herein, the term "in a plan view" may be defined as a state viewed in the third direction DR3. Herein, the term "in a cross-sectional view" may be defined as a state viewed in the first direction DR1 or the second direction DR2. The directions indicated by the first to third directions DR1 to DR3 are relative concept and thus may be changed to other directions.

Referring to FIG. 3, the display panel DP may include a display area DA and a non-display area NDA. Although FIG. 3 illustrates the display area DA defined within a front surface of the display panel DP, an embodiment of the invention is not limited thereto.

The display area DA may be an area which is activated and displays an image in response to an electric signal. The display area DA may be an area in which a plurality of pixel units PXU are arranged. The pixel unit PXU may correspond to a group of the pixels PX11 to PXnm (see FIG. 1) repeatedly arranged according to color and arrangement of light output through the pixels PX11 to PXnm (see FIG. 1) within the display area DA.

The pixel units PXU may be arranged within the display area DA according to a predetermined rule. FIG. 3 illustratively shows that the pixel units PXU are arranged along the first direction DR1 and second direction DR2. The pixel units PXU may include pixels each including a pixel circuit and a light emitting element, and an embodiment of the pixel units PXU will be described later with reference to FIGS. 4A and 4B.

The non-display area NDA may be arranged adjacent to the display area DA to define a shape of the display area DA. For example, the non-display area NDA may surround the display area DA. However, an embodiment of the invention is not limited thereto, and the non-display area NDA may be arranged on one side of the display area DA or may not be provided. The non-display area NDA may be an area in which a driving circuit for driving the pixel units PXU arranged in the display area DA, or various pads or signal lines for providing electric signals to the pixel units PXU are arranged.

In the present embodiment, the scan driving circuit SDC and the data driving circuit DDC may be mounted on the display panel DP. The scan driving circuit SDC and the data driving circuit DDC may be arranged in the non-display area NDA. However, an embodiment of the invention is not limited thereto, and one of the scan driving circuit SDC and the data driving circuit DDC may overlap at least portion of the pixel units PXU in a plan view, and, in this manner, the display panel DP having a reduced size of the non-display area NDA may be provided.

Unlike the illustration of FIG. 3, the scan driving circuit SDC may be provided as two separate driving circuits and may be spaced apart from each other with the display area DA therebetween. Alternatively, the scan driving circuit SDC may be provided in plurality, and an embodiment of the invention is not limited thereto.

Figure 4A:
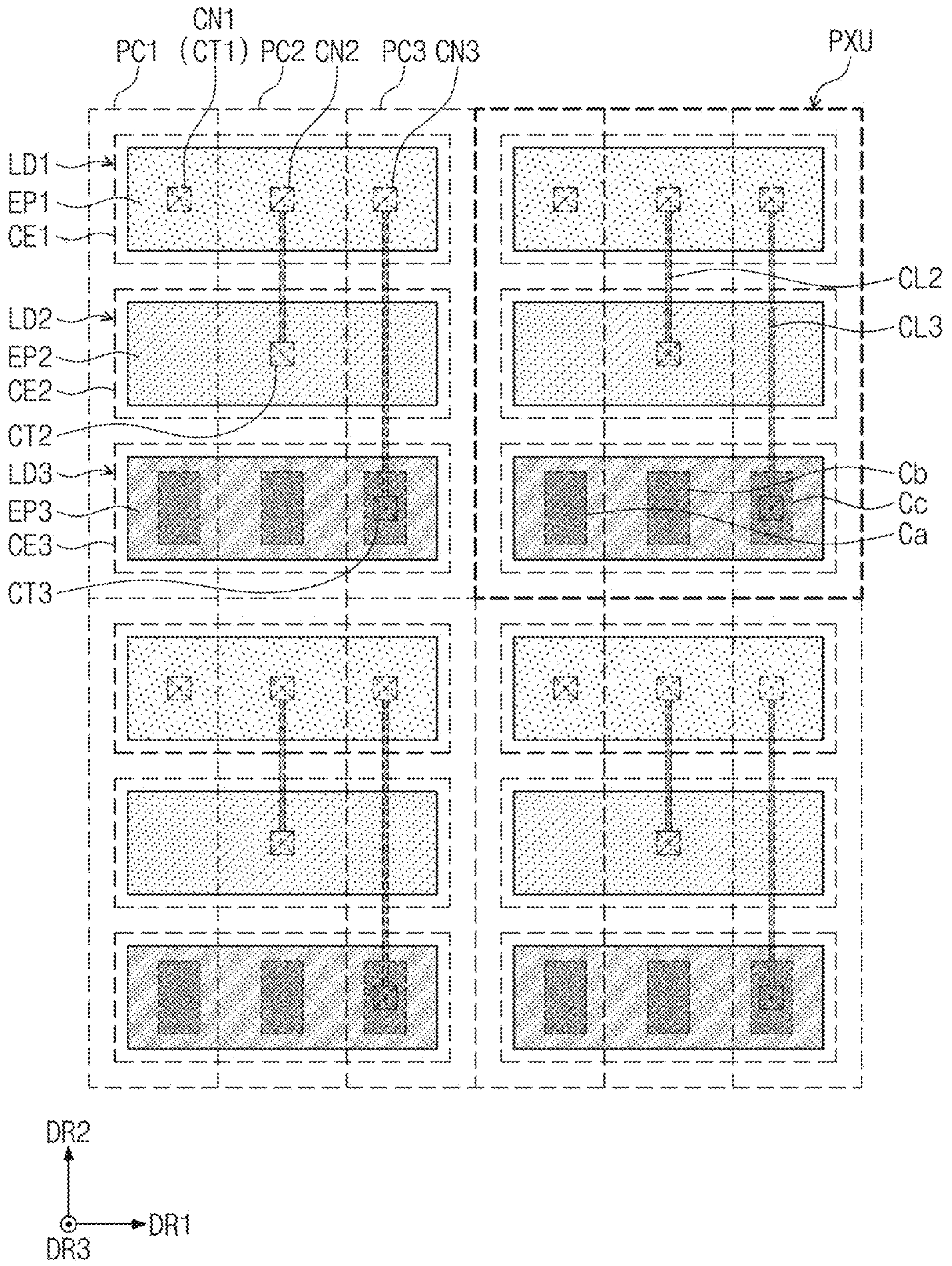
FIGS. 4A and 4B are plan views illustrating a pixel unit according to an embodiment of the invention.
Figure 4B:
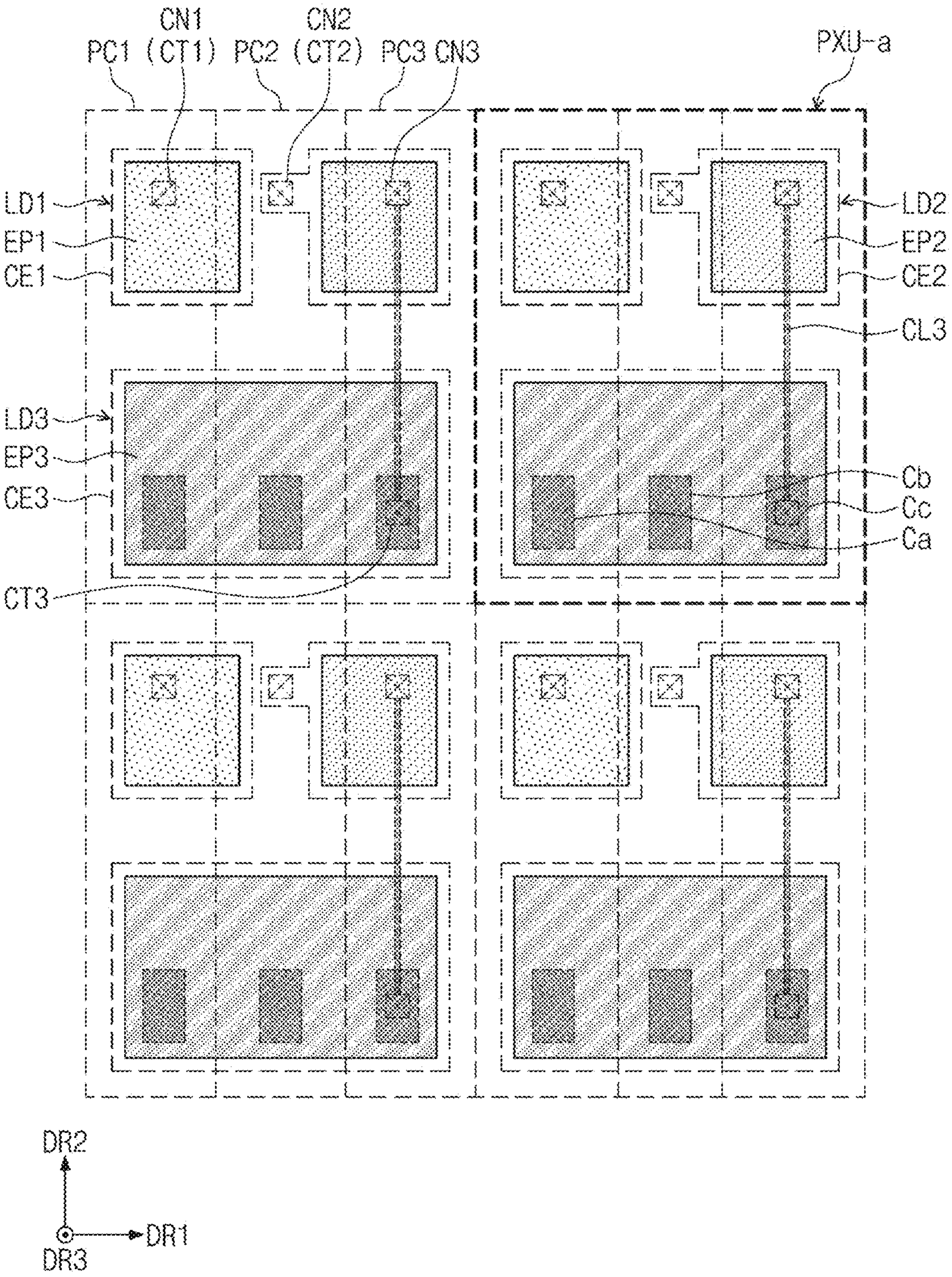

FIGS. 4A and 4B are plan views illustrating pixel units PXU and PXU-a according to an embodiment of the invention. FIGS. 4A and 4B schematically illustrate four pixel units PXU and PXU-a arranged in two rows and two columns. Embodiments of the pixel units PXU and PXU-a illustrated in FIGS. 4A and 4B include substantially the same elements and are partially different in terms of an arrangement position and shape of light emitting elements.

Referring to FIGS. 4A and 4B, the pixel units PXU and PXU-a may include first to third pixels. The first to third pixels each may correspond to the pixel PXij of FIG. 2.

The first pixel may include a first pixel circuit PC1 and a first light emitting element LD1 connected to the first pixel circuit PC1. The second pixel may include a second pixel circuit PC2 and a second light emitting element LD2 connected to the second pixel circuit PC2. The third pixel may include a third pixel circuit PC3 and a third light emitting element LD3 connected to the third pixel circuit PC3. The first to third pixel circuits PC1, PC2, and PC3 each may correspond to the pixel circuit PC of FIG. 2, and the first to third light emitting elements LD1, LD2, and LD3 may correspond to the light emitting element LD of FIG. 2.

The first to third pixel circuits PC1, PC2, and PC3 may include capacitor parts Ca, Cb, and Cc, respectively. The capacitor parts Ca, Cb, and Cc may each correspond to an area in which capacitor electrodes forming the first capacitor C1 and the second capacitor C2 of FIG. 2 are arranged. In the present embodiment, the pixel PXij (see FIG. 2) is described as including the plurality of capacitors C1 and C2 (see FIG. 2), but the capacitor parts Ca, Cb, and Cc may correspond to an area in which electrodes forming one capacitor are arranged if the pixel includes one capacitor.

The first to third light emitting elements LD1, LD2, and LD3 may include cathodes CE1, CE2, and CE3, respectively, emission parts EP1, EP2, and EP3, respectively, and anodes arranged on the pixel circuits PC1, PC2, and PC3, respectively. The anodes of the first to third light emitting elements LD1, LD2, and LD3 may be provided as an integrated electrode overlapping the first to third pixel circuits PC1, PC2, and PC3. An area in which the light emitting elements LD1, LD2, and LD3 are arranged may be an area in which the cathodes CE1, CE2, and CE3, emission parts EP1, EP2, and EP3, and anodes forming the light emitting elements LD1, LD2, and LD3 overlap. For convenience, the anodes are not illustrated in FIGS. 4A and 4B.

The first to third emission parts EP1, EP2. and EP3 may be areas in which light is output within the first to third light emitting elements LD1, LD2, and LD3, respectively. The first to third emission parts EP1, EP2, and EP3 may be arranged in correspondence with emission openings OP1 and OP3 (see FIG. 5) defined in a pixel defining layer PDL (see FIG. 5) described below.

The first to third emission parts EP1, EP2, and EP3 each may have a substantially quadrilateral shape in a plan view. However, the shapes of the first to third emission parts EP1, EP2, and EP3 in a plan view are not limited to the illustrated shapes, and may be variously changed to other shapes such as polygonal, circular, or elliptical shapes.

An area size of the first to third emission parts EP1, EP2, and EP3 in a plan view may be variously designed according to color of light displayed by the first to third emission parts EP1, EP2, and EP3. For example, the first to third emission parts EP1, EP2, and EP3 may have substantially the same area size in a plan view, but are not limited thereto, and the first to third emission parts EP1, EP2, and EP3 may have different area sizes from each other in another embodiment.

The first to third emission parts EP1, EP2, and EP3 may emit lights of different colors. For example, the first emission part EP1 may emit red light, the second emission part EP2 may emit green light, and the third emission part EP3 may emit blue light. However, a color combination of lights emitted by the first to third emission parts EP1, EP2, and EP3 is not limited thereto.

Referring to FIG. 4A, the first to third pixel circuits PC1, PC2, and PC3 may be arranged along one direction within the pixel unit PXU. For example, the first to third pixel circuits PC1, PC2, and PC3 may be arranged along the first direction DR1.

The pixel unit PXU including the first to third pixel circuits PC1, PC2, and PC3 may be provided in plurality and arranged along the first direction DR1 and second direction DR2. Therefore, the first pixel circuits PC1 of the pixel units PXU arranged in the same column may be arranged along the second direction DR2. The pixel circuits PC1, PC2, and PC3 of the pixel units PXU arranged in the same row may be repeatedly arranged in order of the first pixel circuit PC1, the second pixel circuit PC2, and the third pixel circuit PC3 in the first direction DR1.

Since the first to third pixel circuits PC1, PC2, and PC3 are arranged along the first direction DR1 in the pixel unit PXU, the capacitor parts Ca, Cb, and Cc of the first to third pixel circuits PC1, PC2, and PC3 may also be arranged along the first direction DR1. That is, the first to third capacitor parts Ca, Cb, and Cc may be arranged along the first direction DR1.

The above descriptions may also apply to the first to third pixel circuits PC1, PC2, and PC3 of the pixel unit PXU-a of FIG. 4B.

Referring to FIG. 4A, an arrangement direction of the first to third light emitting elements LD1, LD2, and LD3 may be different from an arrangement direction of the first to third pixel circuits PC1, PC2, and PC3 connected to the first to third light emitting elements LD1, LD2, and LD3, respectively. For example, within the pixel unit PXU, the first to third light emitting elements LD1, LD2, and LD3 may be arranged along the second direction DR2 intersecting the arrangement direction (i.e., first direction DR1) of the first to third pixel units PC1, PC2 and PC3.

The arrangement direction of the first to third light emitting elements LD1, LD2, and LD3 may correspond to an arrangement direction of the first to third cathodes CE1, CE2, and CE3. For example, the first to third cathodes CE1, CE2, and CE3 may be arranged spaced apart from each other along the second direction DR2 within the pixel unit PXU.

As described above, the first to third pixel circuits PC1, PC2, and PC3 each may include transistors, and one of the transistors may be connected to the cathode of the corresponding light emitting element. In the present embodiment, the transistor connected to the cathode of the light emitting element may be defined as a connection transistor. For example, in the pixel PXij of FIG. 2, the connection transistor may correspond to the sixth transistor T6.

The first to third pixel circuits PC1, PC2, and PC3 may include first to third circuit connection parts CN1, CN2, and CN3, respectively. The first circuit connection part CN1 may be formed to overlap the connection transistor of the first pixel circuit PC1. The first circuit connection part CN1 may correspond to a connection electrode portion connected to the connection transistor of the first pixel circuit PC1. The second circuit connection part CN2 may correspond to a connection electrode portion connected to and overlapping the connection transistor of the second pixel circuit PC2, and the third circuit connection part CN3 may correspond to a connection electrode portion connected to and overlapping the connection transistor of the third pixel circuit PC3 in a plan view. Therefore, the first to third circuit connection parts CN1, CN2, and CN3 corresponding to arrangement positions of the connection transistors of the first to third pixel circuits PC1, PC2, and PC3 may be arranged side by side in the first direction DR1.

The first to third pixel circuits PC1, PC2, and PC3 may include first to third emission connection parts CT1, CT2, and CT3, respectively. The first emission connection part CT1 may be formed to overlap the first cathode CE1 of the first light emitting element LD1. The first emission connection part CT1 may correspond to a connection electrode portion connected to the first cathode CE1 of the first light emitting element LD1. The second emission connection part CT2 may correspond to a connection electrode portion connected to and overlapping the second cathode CE2 of the second light emitting element LD2, and the third emission connection part CT3 may correspond to a connection electrode portion connected to and overlapping the third cathode CE3 of the third light emitting element LD3 in a plan view.

The first light emitting element LD1 may overlap the first circuit connection part CN1 of the first pixel circuit PC1. The first light emitting element LD1 extending in the first direction DR1 that is the arrangement direction of the first to third pixel circuits PC1, PC2, and PC3 may also overlap the second and third circuit connection parts CN2 and CN3 of the second and third pixel circuits PC2 and PC3 in a plan view.

The first circuit connection part CN1 and the first emission connection part CT1 of the first pixel circuit PC1 may be formed in substantially the same connection electrode. That is, the first light emitting element LD1 may be arranged to overlap the connection transistor of the first pixel circuit PC1, and the first light emitting element LD1 and the connection transistor of the first pixel circuit PC1 may be electrically connected through the first circuit connection part CN1 and the first emission connection part CT1 which overlap each other in a plan view.

The first light emitting element LD1 may be spaced apart from the first capacitor part Ca of the first pixel circuit PC1 in a plan view. That is, the first light emitting element LD1 may be spaced apart from capacitor electrodes corresponding to the first capacitor part Ca in a plan view. The first light emitting element LD1 may also be spaced apart from the second and third capacitor parts Cb and Cc of the second and third pixel circuits PC2 and PC3.

The first light emitting element LD1 may include the first emission part EP1 that emits red light, and the first emission part EP1 may be affected in terms of light emission efficiency when a largely stepped portion is present in an arrangement area thereof. That is, if the first light emitting element LD1 extends in the second direction DR2 and overlaps both the first circuit connection part CN1 and first capacitor part Ca of the first pixel circuit PC1, the light emission efficiency may deteriorate due to a step between an area in which the first capacitor part Ca is arranged and an area in which the first capacitor part Ca is not arranged. However, the first light emitting element LD1 according to an embodiment of the invention is spaced apart from the first capacitor part Ca in a plan view, and thus the first emission part EP1 may be prevented from being formed in an area in which a large step is present, and the light emission efficiency of the first light emitting element LD1 may be improved.

The second light emitting element LD2 may be spaced apart from the second circuit connection part CN2 of the second pixel circuit PC2 in a plan view. For example, the second light emitting element LD2 may be arranged so as to be spaced apart from the connection transistor of the second pixel circuit PC2 disposed adjacent to an upper portion of the second pixel circuit PC2 and to correspond to a center portion of the first to third pixel circuits PC1, PC2, and PC3. Therefore, the second emission connection part CT2 overlapping the second light emitting element LD2 in a plan view may be spaced apart from the second circuit connection part CN2.

The second pixel circuit PC2 may include a second connection line CL2 connected to each of the second circuit connection part CN2 and the second emission connection part CT2. The connection transistor of the second pixel circuit PC2 and the second cathode CE2 of the second light emitting element LD2 may be spaced apart from each other in a plan view, and the second connection line CL2 may electrically connect the second circuit connection part CN2 and the second emission connection part CT2 spaced apart from each other. Therefore, the connection transistor of the second pixel circuit PC2 and the second light emitting element LD2 may be electrically connected through the second circuit connection part CN2 and the second emission connection part CT2 which are connected by the second connection line CL2.

One end of the second connection line CL2 may be connected to the second circuit connection part CN2. In an embodiment, a connection electrode corresponding to the second circuit connection part CN2 and the one end of the second connection line CL2 may be integrally formed in the same layer. However, an embodiment of the invention is not limited thereto, and the second connection line CL2 may be arranged on a layer different from a layer of the connection electrode corresponding to the second circuit connection part CN2 and may be connected thereto through a contact hole.

Another end of the second connection line CL2 may be connected to the second emission connection part CT2. In an embodiment, a connection electrode corresponding to the second emission connection part CT2 and the other end of the second connection line CL2 may be integrally formed in the same layer. However, an embodiment of the invention is not limited thereto, and the second connection line CL2 may be arranged on a layer different from a layer of the connection electrode corresponding to the second emission connection part CT2 and may be connected thereto through a contact hole.

The second connection line CL2 may include a line extending in the second direction DR2. FIG. 4A illustrates the second connection line CL2 as extending in a form of a straight line, but an embodiment of the invention is not limited thereto, and the second connection line CL2 may include a curved portion provided that the second connection line CL2 connects the second circuit connection part CN2 and the second emission connection part CT2 spaced apart from each other in a plan view.

The second light emitting element LD2 may be spaced apart from the second capacitor part Cb of the second pixel circuit PC2 in a plan view. The second light emitting element LD2 may also be spaced apart from the first and third capacitor parts Ca and Cc of the first and third pixel circuits PC1 and PC3.

The second light emitting element LD2 may include the second emission part EP2 that emits green light, and the second emission part EP2 may be affected in terms of light emission efficiency when a largely stepped portion is present in an arrangement area thereof. If the second light emitting element LD2 is arranged so as to overlap both the second circuit connection part CN2 and second capacitor part Cb of the second pixel circuit PC2 in a plan view, the light emission efficiency may deteriorate due to a step between an area in which the second capacitor part Cb is arranged and an area in which the second capacitor part Cb is not arranged. However, the second light emitting element LD2 according to an embodiment of the invention is spaced apart from the second capacitor part Cb in a plan view, and thus the second emission part EP2 may be prevented from being formed in an area in which a large step is present, and the light emission efficiency of the second light emitting element LD2 may be improved.

The third light emitting element LD3 may be spaced apart from the third circuit connection part CN3 of the third pixel circuit PC3 in a plan view. For example, the connection transistor of the third pixel circuit PC3 and the third light emitting element LD3 may be spaced apart from each other in a plan view. Therefore, the third emission connection part CT3 overlapping the third light emitting element LD3 may be spaced apart from the third circuit connection part CN3.

The third pixel circuit PC3 may include a third connection line CL3 connected to each of the third circuit connection part CN3 and the third emission connection part CT3. The connection transistor of the third pixel circuit PC3 and the third cathode CE3 of the third light emitting element LD3 may be spaced apart from each other in a plan view, and the third connection line CL3 may electrically connect the third circuit connection part CN3 and the third emission connection part CT3 spaced apart from each other. Therefore, the connection transistor of the third pixel circuit PC3 and the third light emitting element LD3 may be electrically connected through the third circuit connection part CN3 and the third emission connection part CT3 which are connected by the third connection line CL3.

One end of the third connection line CL3 may be connected to the third circuit connection part CN3, and another end of the third connection line CL3 may be connected to the third emission connection part CT3. A connection electrode corresponding to the third circuit connection part CN3 and the third connection line CL3 may be integrally formed in the same layer, and a connection electrode corresponding to the third emission connection part CT3 and the third connection line CL3 may be integrally formed in the same layer. However, an embodiment of the invention is not limited thereto, and the third connection line CL3 may be arranged on a layer different from a layer of at least one of the third circuit connection part CN3 or the third emission connection part CT3 and may be connected thereto through a contact hole.

The third connection line CL3 may include a line extending in the second direction DR2. The third connection line CL3 may have a form of a straight line or include a curved portion according to positions of the third circuit connection part CN3 and the third emission connection part CT3, and is not limited to any one shape provided that the third connection line CL3 connects the third circuit connection part CN3 and the third emission connection part CT3 which are spaced apart from each other.

In the second direction DR2, the third connection line CL3 may have a larger length than the second connection line CL2. That is, a separation distance between the third light emitting element LD3 and the connection transistor of the third pixel circuit PC3 may be larger than a separation distance between the second light emitting element LD2 and the connection transistor of the second pixel circuit PC2 in a plan view, and thus the length of the third connection line CL3 may be larger than the length of the second connection line CL2. However, an embodiment of the invention is not necessarily limited thereto.

The third light emitting element LD3 may overlap the third capacitor part Cc of the third pixel circuit PC3 in a plan view. The first to third capacitor parts Ca, Cb, and Cc of the first to third pixel circuits PC1, PC2, and PC3 may be arranged side by side in the first direction DR1, and the third light emitting element LD3 may overlap the first to third capacitor parts Ca, Cb, and Cc in a plan view.

The third light emitting element LD3 may include the third emission part EP3 that emits blue light, and even if a large step is present in an arrangement area of the third emission part EP3, the third emission part EP3 may not significantly deteriorate in terms of light emission efficiency compared to emission parts that emit red light or green light.

If the first to third light emitting elements LD1, LD2, and LD3 are all arranged so as not to overlap the first to third capacitor parts Ca, Cb, and Cc in a plan view, area sizes of capacitor electrodes of the capacitor parts Ca, Cb, and Cc are required to be reduced, or an area in which the first to third light emitting elements LD1, LD2, and LD3 are arranged is required to be limited. A capacitance of a capacitor may reduce when the area sizes of the capacitor electrodes are reduced, and thus operation reliability of the first to third pixel circuits PC1, PC2, and PC3 may deteriorate. Moreover, when an arrangement area of the first to third light emitting elements LD1, LD2, and LD3 is limited, an area in which light is output from the first to third light emitting elements LD1, LD2, and LD3 may be reduced.

However, according to the invention, the third emission part EP3 of the third light emitting element LD3 which is less affected by a step in an arrangement area thereof is arranged so as to overlap the first to third capacitor parts Ca, Cb, and Cc, thus sufficiently securing area sizes of the capacitor electrodes of the first to third capacitor parts Ca, Cb, and Cc and the first to third light emitting elements LD1 to LD3 without significantly deteriorating the light emission efficiency of the third light emitting element LD3. Furthermore, the first and second light emitting elements LD1 and LD2 which are affected by a step in an arrangement area thereof are arranged so as not to overlap the first to third capacitor parts Ca, Cb, and Cc in a plan view, and thus the light emission efficiency of the first and second light emitting elements LD1 and LD2 may be improved, and, as a result, the display panel DP (see FIG. 1) according to the invention may be improved in terms of light emission efficiency.

Referring to FIG. 4B, within the pixel unit PXU-a, the first light emitting element LD1 and the second light emitting element LD2 may be arranged along the first direction DR1, and the third light emitting element LD3 may be arranged in parallel with the first and second light emitting elements LD1 and LD2 along the second direction DR2.

The pixel unit PXU-a may be provided in plurality and may be arranged along the first direction DR1 and second direction DR2, and the first light emitting elements LD1 and the second light emitting elements LD2 of the pixel units PXU-a may be alternately arranged in the first direction DR1. The third light emitting elements LD3 of the pixel units PXU-a may be arranged side by side in the first direction DR1. The third light emitting elements LD3 of the pixel units PXU-a may be arranged alternately with the first light emitting elements LD1 or with the second light emitting elements LD2 in the second direction DR2.

An arrangement position of the first to third light emitting elements LD1, LD2, and LD3 may correspond to an arrangement position of the first to third cathodes CE1, CE2, and CE3. Within the pixel unit PXU-a, the first cathode CE1 and the second cathode CE2 may be arranged spaced apart from each other in the first direction DR1. The first cathode CE1 and the second cathode CE2 each may be arranged spaced apart, in the second direction DR2, from the third cathode CE3 extending along the first direction DR1.

At least two of the first to third emission parts EP1, EP2, and EP3 may have a different area size. For example, the area size of the first emission part EP1 may be substantially the same as the area size of the second emission part EP2, and the area size of each of the first emission part EP1 and the second emission part EP2 may be smaller than the area size of the third emission part EP3. However, the area sizes of the first to third emission parts EP1, EP2, and EP3 may be differently designed according to the display apparatus DD (see FIG. 1) to which the display panel DP (see FIG. 1) is applied, and an embodiment of the invention is not necessarily limited thereto.

The first circuit connection part CN1 and the first emission connection part CT1 of the first pixel circuit PC1 may be formed in substantially the same connection electrode. That is, the first cathode CE1 of the first light emitting element LD1 may be arranged to overlap the connection transistor of the first pixel circuit PC1, and the first light emitting element LD1 and the connection transistor of the first pixel circuit PC1 may be electrically connected through the first circuit connection part CN1 and the first emission connection part CT1 which overlap each other in a plan view.

The second circuit connection part CN2 and the second emission connection part CT2 of the second pixel circuit PC2 may be formed in substantially the same connection electrode. That is, the second cathode CE2 of the second light emitting element LD2 may be arranged to overlap the connection transistor of the second pixel circuit PC2, and the second light emitting element LD2 and the connection transistor of the second pixel circuit PC2 may be electrically connected through the second circuit connection part CN2 and the second emission connection part CT2 which overlap each other in a plan view.

According to an embodiment, the second cathode CE2 may include a portion protruding in a plan view so as to overlap the second circuit connection part CN2. However, an embodiment of the invention is not limited thereto, and a shape of the second cathode CE2 may be changed according to an arrangement position of the connection transistor of the second pixel circuit PC2. For example, the second cathode CE2 may have substantially the same shape as a shape of the first cathode CE1 without including a protruding portion.

The third light emitting element LD3 may be spaced apart from the third circuit connection part CN3 of the third pixel circuit PC3 in a plan view. The connection transistor of the third pixel circuit PC3 may be electrically connected to the third light emitting element LD3 through the third connection line CL3 that electrically connects the third circuit connection part CN3 and the third emission connection part CT3. With regard to the third connection line CL3, the same descriptions as provided above with reference to FIG. 4A may be applied.

The first light emitting element LD1 and the second light emitting element LD2 may be arranged spaced apart from the first to third capacitor parts Ca, Cb, and Cc of the first to third pixel circuits PC1, PC2, and PC3 in a plan view. The third light emitting element LD3 may be arranged to overlap the first to third capacitor parts Ca, Cb, and Cc of the first to third pixel circuits PC1, PC2, and PC3 in a plan view.

The first to third light emitting elements LD1, LD2, and LD3 may emit red light, green light, and blue light, respectively, and the third light emitting element LD3 that is less affected by a step caused by arrangement of the capacitor parts Ca, Cb, and Cc may be arranged to overlap the capacitor parts Ca, Cb, and Cc. Accordingly, the light emission efficiency of the first and second light emitting elements LD1 and LD2 may be effectively improved without significantly deteriorating the light emission efficiency of the third light emitting element LD3. Furthermore, since the first to third light emitting elements LD1, LD2, and LD3 and the capacitor parts Ca, Cb, and Cc have a sufficiently large area size, quality of the display panel DP (see FIG. 1) may be effectively improved.

Figure 5:
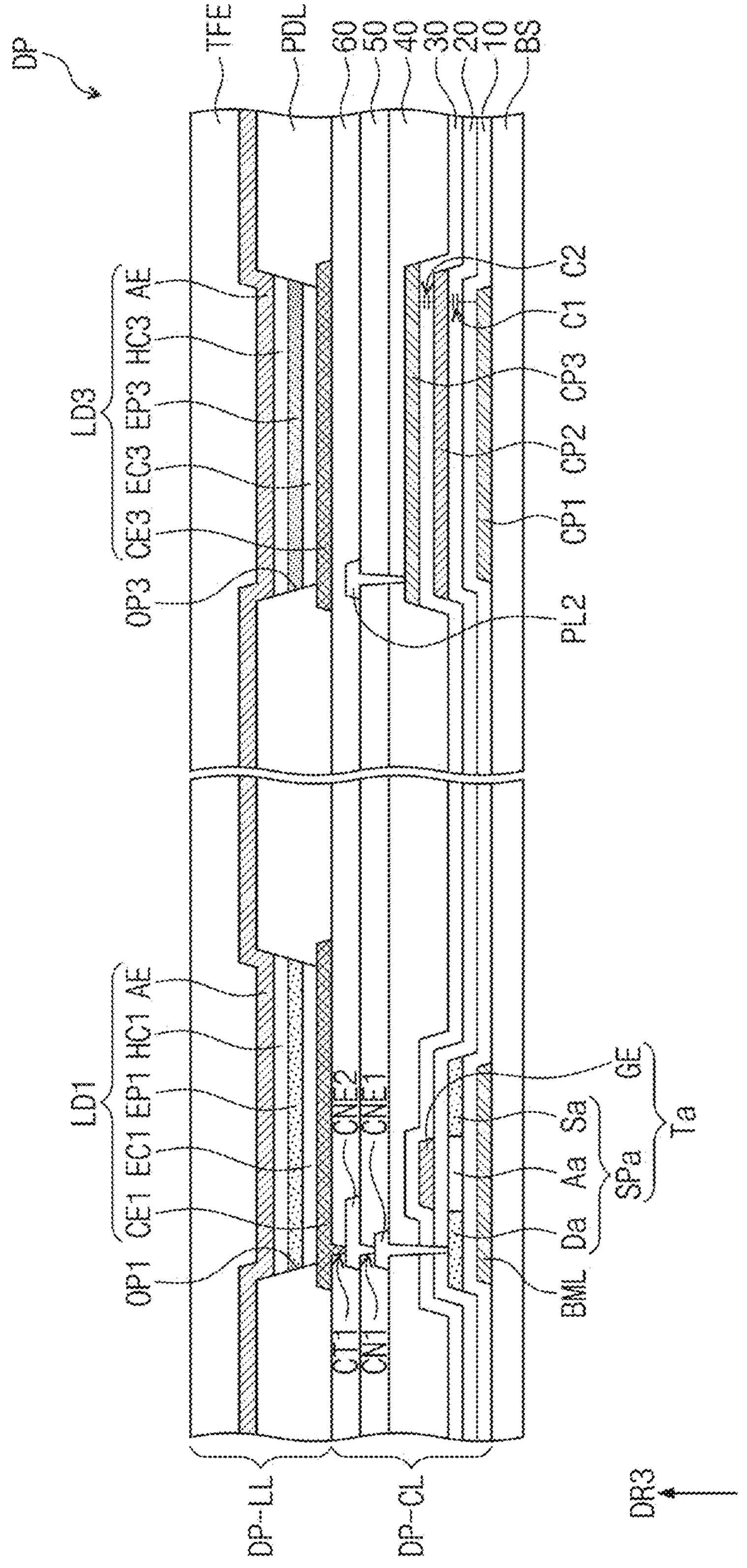
FIG. 5 is a cross-sectional view illustrating a display panel according to an embodiment of the invention.

FIG. 5 is a cross-sectional view illustrating the display panel DP according to an embodiment of the invention. FIG. 5 schematically illustrates a cross-section corresponding to an area in which the first light emitting element LD1 and third light emitting element LD3 of the display panel DP are arranged.

Referring to FIG. 5, the display panel DP may include a base layer BS, a circuit layer DP-CL, and a display element layer DP-LL.

The base layer BS may provide a base surface on which the circuit layer DP-CL is arranged. The base layer BS may be a rigid substrate or a flexible substrate that is bendable, foldable, or rollable. For example, the base layer BS may be a glass substrate, a metal substrate, a polymer substrate, or the like.

The base layer BS may have a laminate structure in which an inorganic layer, an organic layer, or a composite material layer is laminated. For example, the base layer BS may include a first polymer resin layer, a silicon oxide layer, an amorphous silicon layer, and a second polymer resin layer which are sequentially laminated. The polymer resin layers may include at least one of acrylic resin, methacrylic resin, polyisoprene, vinyl-based resin, epoxy-based resin, urethane-based resin, cellulosic resin, siloxane resin, polyamide-based resin, or perylene-based resin. However, an embodiment of the base layer BS is not limited thereto.

The circuit layer DP-CL may be arranged on the base layer BS. The circuit layer DP-CL may include a plurality of insulating layers 10 to 60, and conductive patterns and semiconductor patterns that are arranged between the insulating layers 10 to 60 and constitute a transistor Ta, capacitors C1 and C2, etc. The circuit layer DP-CL may be formed by forming an insulating layer, a conductive layer, and a semiconductor layer on the base layer BS through coating, deposition, or the like and patterning the insulating layer, the conductive layer, and the semiconductor layer through a photolithography process performed multiple times.

FIG. 5 illustrates a cross-section corresponding to the transistor Ta and capacitors C1 and C2 of the first pixel circuit PC1 (see FIG. 4A) among elements of the circuit layer DP-CL. The transistor Ta illustrated in FIG. 5 may correspond to the connection transistor connected to the first light emitting element LD1 through the first circuit connection part CN1 and the first emission connection part CT1, and is referred to as a connection transistor Ta below.

The plurality of insulating layers 10 to 60 may include first to sixth insulating layers 10 to 60. The first to sixth insulating layers 10 to 60 each may be an inorganic layer and/or organic layer, and may have a single-layer or multi-layer structure. The inorganic layer may include at least one of aluminum oxide, titanium oxide, silicon oxide, silicon nitride, silicon oxynitride, zirconium oxide, or hafnium oxide. However, a material of the inorganic layer is not limited to the above example.

The organic layer may include at least one of acrylic resin, methacrylic resin, polyisoprene, vinyl-based resin, epoxy-based resin, urethane-based resin, cellulosic resin, siloxane resin, polyamide-based resin, or perylene-based resin. However, a material of the organic layer is not limited to the above example.

The display panel DP may further include a lower metal part BML arranged under the connection transistor Ta. The lower metal part BML may overlap the connection transistor Ta in a plan view. The lower metal part BML may prevent electric potential caused by a polarization phenomenon of the base layer BS from affecting the connection transistor Ta. Furthermore, the lower metal part BML may block light that is incident on the connection transistor Ta from below the lower metal part BML.

The lower metal part BML may be connected to a wiring through a contact part so as to receive a constant voltage or a pulse signal, but is not limited thereto, and may be provided in a form isolated from another electrode or wiring.

The lower metal part BML may include a reflective metal. For example, the lower metal part BML may include titanium (Ti), molybdenum (Mo), alloys containing molybdenum, aluminum (Al), alloys containing aluminum, aluminum nitride (AlN), tungsten (W), tungsten nitride (WN), copper (Cu), or the like. However, a material of the lower metal part BML is not limited to the above example.

The first insulating layer 10 may be arranged on the base layer BS and cover the lower metal part BML. The connection transistor Ta may be arranged on the first insulating layer 10. The connection transistor Ta may include a semiconductor pattern Spa and a gate electrode GE, and the semiconductor pattern Spa may be arranged on the first insulating layer 10.

The semiconductor pattern Spa may include a semiconductor material. For example, the semiconductor pattern Spa may include an oxide semiconductor, and the oxide semiconductor may include transparent conductive oxide ("TCO") such as indium tin oxide ("ITO"), indium zinc oxide ("IZO"), indium gallium zinc oxide ("IGZO"), zinc oxide (ZnO), or indium oxide ($In_2O_3$). However, an embodiment of the invention is not limited thereto, and the semiconductor pattern Spa may include amorphous silicon, low temperature polycrystalline silicon, or polycrystalline silicon.

The semiconductor pattern Spa may include a source Sa, a drain Da, and a channel Aa (or active) divided according to a degree of conductivity. The source Sa and the drain Da may be spaced apart from each other with the channel Aa therebetween, and may be an area having higher conductivity than the channel Aa. For example, the source Sa and the drain Da may correspond to an area of the semiconductor pattern Spa of which conductivity has been increased by reduction or doping. The channel Aa may correspond to an area which has not been reduced or doped or has been reduced or doped at a lower ratio compared to the source Sa and the drain Da.

The source Sa and the drain Da having relatively high conductivity may correspond to a source electrode and a drain electrode of the connection transistor Ta, respectively. However, an embodiment of the invention is not limited thereto, and the connection transistor Ta may be further provided with an additional electrode connected to each of the source Sa and the drain Da, and is not limited to any one embodiment.

The second insulating layer 20 may be arranged on the first insulating layer 10 and cover the semiconductor pattern Spa. FIG. 5 illustrates the second insulating layer 20 of a film type as an example, but the second insulating layer 20 may also be provided as an insulating pattern overlapping the channel Aa of the connection transistor Ta according to an embodiment.

The gate electrode GE may be arranged on the second insulating layer 20. The gate electrode GE may correspond to a gate of the connection transistor Ta. The gate electrode GE may overlap the channel Aa of the semiconductor pattern Spa in a plan view. The gate electrode GE may function as a mask during a process of reducing or doping the semiconductor pattern Spa of the connection transistor Ta.

The gate electrode GE may be arranged on the semiconductor pattern Spa. However, this is merely illustrative, and the gate electrode GE may also be arranged under the semiconductor pattern Spa, and is not limited to any one embodiment.

The gate electrode GE may include titanium (Ti), silver (Ag), molybdenum (Mo), aluminum (Al), aluminum nitride (AlN), tungsten (W), tungsten nitride (WN), copper (Cu), or an alloy thereof. However, a material of the gate electrode GE is not limited to the above example.

Other transistors constituting a pixel circuit may be formed through the same process and have the same structure as the connection transistor Ta of FIG. 5. However, an embodiment of the invention is not limited thereto, and at least a portion of the other transistors constituting the pixel circuit may have a structure different from the connection transistor Ta, and is not limited to any one embodiment.

The circuit layer DP-CL may include a first capacitor electrode CP1, a second capacitor electrode CP2, and a third capacitor electrode CP3.

The first capacitor electrode CP1 may be arranged on the base layer BS. For example, the first capacitor electrode CP1 may be arranged on the first insulating layer 10. The first capacitor electrode CP1 may be arranged in the same layer as the lower metal part BML. The first capacitor electrode CP1 may be an electrode provided in an isolated form that is spaced apart from the lower metal part BML. However, an embodiment of the invention is not limited thereto, and the first capacitor electrode CP1 may have an integrated form with the lower metal part BML.

The second capacitor electrode CP2 may be arranged on the first capacitor electrode CP1. For example, the second capacitor electrode CP2 may be arranged on the second insulating layer 20. The second capacitor electrode CP2 may be arranged in the same layer as the gate electrode GE. The second capacitor electrode CP2 may be an electrode provided in an isolated form that is spaced apart from the gate electrode GE. However, an embodiment of the invention is not limited thereto, and the second capacitor electrode CP2 may have an integrated form with the gate electrode GE.

The first capacitor electrode CP1 and the second capacitor electrode CP2 which overlap each other in a plan view may form the first capacitor C1. The first capacitor electrode CP1 and the second capacitor electrode CP2 may be spaced apart from each other with the first and second insulating layers 10 and 20 therebetween in a thickness direction.

The third capacitor electrode CP3 may be arranged on the second capacitor electrode CP2. For example, the third capacitor electrode CP3 may be arranged on the third insulating layer 30. The third capacitor electrode CP3 may be spaced apart from another conductive electrode arranged in the same layer as the third capacitor electrode CP3. However, an embodiment of the invention is not limited thereto, and the third capacitor electrode CP3 may be integrally formed with the conductive electrode in the same layer.

The second capacitor electrode CP2 and the third capacitor electrode CP3 which overlap each other in a plan view may form the second capacitor C2. The second capacitor electrode CP2 and the third capacitor electrode CP3 may be spaced apart from each other with the third insulating layer 30 therebetween in the thickness direction.

The fourth insulating layer 40 may be arranged on the third insulating layer 30 and may cover the third connection electrode CP3. The fifth insulating layer 50 may be arranged on the fourth insulating layer 40.

The circuit layer DP-CL may include a plurality of connection electrodes CNE1 and CNE2. The connection electrodes CNE1 and CNE2 may include a first connection electrode CNE1 arranged on the fourth insulating layer 40 and a second connection electrode CNE2 arranged on the fifth insulating layer 50.

The first connection electrode CNE1 may be connected to the drain Da of the connection transistor Ta through a contact hole penetrating the second to fourth insulating layers 20 to 40. The second connection electrode CNE2 may be connected to the first connection electrode CNE1 through a contact hole penetrating the fifth insulating layer 50. Therefore, the second connection electrode CNE2 may be connected to the drain Da of the connection transistor Ta through the first connection electrode CNE1.

Certain portions of the first and second connection electrodes CNE1 and CNE2 connected to the drain Da of the connection transistor Ta may correspond to the first circuit connection part CN1. FIG. 5 illustrates that the first circuit connection part CN1 is formed as the connection electrodes CNE1 and CNE2 that are arranged on different layers and connected to the connection transistor Ta through contact holes, but an embodiment of the invention is not limited thereto, and the first circuit connection part CN1 may correspond to a single connection electrode connected to the connection transistor Ta.

The second connection electrode CNE2 may be connected to the first cathode CE1 of the first light emitting element LD1. A portion of the second connection electrode CNE2 connected to the first cathode CE1 may correspond to the first emission connection part CT1. Therefore, the first light emitting element LD1 may be connected to the connection transistor Ta through the first emission connection part CT1 and the first circuit connection part CN1 which overlap each other in a plan view.

Signal lines constituting the circuit layer DP-CL may be arranged between the insulating layers 10 to 60. For example, the second power supply voltage line PL2 through which the second power supply voltage VSS (see FIG. 2) is applied may be arranged on the fifth insulating layer 50. The second power supply voltage line PL2 may be connected to the third capacitor electrode CP3 forming the second capacitor C2 through a contact hole penetrating the fourth and fifth insulating layers 40 and 50.

The sixth insulating layer 60 may be arranged on the fifth insulating layer 50 and may cover the second connection electrode CNE2 and the second power supply voltage line PL2. The sixth insulating layer 60 may provide a base surface on which the display element layer DP-LL is arranged.

In an embodiment, the fifth insulating layer 50 and the sixth insulating layer 60 each may include an organic layer. For example, the fifth insulating layer 50 and the sixth insulating layer 60 each may include general polymers such as polymethylmethacrylate ("PMMA"), benzocyclobutene ("BCB"), polyimide ("PI"), hexamethyldisiloxane ("HMDSO"), or polystyrene ("PS"), or a polymer derivative having a phenol group, an acrylic polymer, an imidic polymer, an arylether polymer, an amidic polymer, a fluoric polymer, a p-xylene polymer, a vinyl alcohol polymer, or a blend thereof. However, an embodiment of the invention is not necessarily limited thereto.

the cross-sectional structure of the circuit layer DP-CL illustrated in FIG. 5 is an example, and a lamination position or the number of insulating layers of the circuit layer DP-CL may be changed according to a configuration or manufacturing process of the circuit layer DP-CL.

The display element layer DP-LL may be arranged on the circuit layer DP-CL. For example, the display element layer DP-LL may be arranged on the sixth insulating layer 60. The display element layer DP-LL may include the light emitting elements LD1 and LD3, the pixel defining layer PDL, and an encapsulation layer TFE.

The pixel defining layer PDL may be arranged on the sixth insulating layer 60. The pixel defining layer PDL may define a plurality of emission openings OP1 and OP3 penetrating the pixel defining layer PDL. The emission openings OP1 and OP3 may be formed in correspondence with areas in which the light emitting elements LD1 and LD3 are arranged. All elements of the light emitting elements LD1 and LD3 may overlap each other in correspondence with the emission openings OP1 and OP3, and light may be emitted by the light emitting elements LD1 and LD3 in areas corresponding to the emission openings OP1 and OP3. Accordingly, shapes of the emission parts EP1 and EP3 in a plan view may substantially correspond to shapes of the emission openings OP1 and OP3.

The pixel defining layer PDL may include a polymer resin. For example, the pixel defining layer PDL may include a polyacrylate-based resin or polyimide-based resin. The pixel defining layer PDL may further include an inorganic material in addition to the polymer resin. For example, the pixel defining layer PDL may include silicon nitride ($SiN_x$), silicon oxide ($SiO_x$), silicon nitrate ($SiO_xN_y$), or the like.

In an embodiment, the pixel defining layer PDL may include a liquid-repellent material or liquid-repellent structure. For example, the pixel defining layer PDL itself may be formed of or include a resin containing a liquid-repellent material, or a surface of the pixel defining layer PDL may include a liquid-repellent material. However, an embodiment of the pixel defining layer PDL is not necessarily limited thereto.

In an embodiment, the pixel defining layer PDL may include a light absorbing material. For example, the pixel defining layer PDL may include a black coloring agent. The black coloring agent may include a black dye or black pigment. The black coloring agent may include carbon black, metals such as chromium, or oxides thereof. However, an embodiment of the pixel defining layer PDL is not necessarily limited thereto.

The light emitting elements LD1 and LD3 may be arranged on the sixth insulating layer 60. The light emitting elements LD1 and LD3 may be arranged in correspondence with the emission openings OP1 and OP3 defined in the pixel defining layer PDL, respectively.

The light emitting elements LD1 and LD3 each may include an organic light emitting element, a quantum-dot light emitting element, a micro light-emitting diode ("LED") element, or a nano light-emitting diode (LED) element. However, an embodiment of the invention is not limited thereto, and the light emitting elements LD1 and LD3 may include various embodiments provided that light may be generated or light intensity may be controlled according to an electric signal. Hereinafter, descriptions will be provided on the basis of the first and third light emitting elements LD1 and LD3 illustrated in FIG. 5, and descriptions about the first light emitting element LD1 may also apply to the above-mentioned second light emitting element LD2 (see FIG. 4A).

The first and third light emitting element LD1 and LD3 may include the cathodes CE1 and CE3, electron transport areas EC1 and EC3, the emission parts EP1 and EP3, and hole transport areas HC1 and HC3, respectively, and an anode AE commonly. A major direction of the light emission by the first and third light emitting element LD1 and LD3 is the third direction DR3.

The cathodes CE1 and CE3 and the anode AE each may be a translucent, transmissive, or reflective electrode. For example, the cathodes CE1 and CE3 and the anode AE each may include a reflective layer formed of silver (Ag), magnesium (Mg), aluminum (Al), platinum (Pt), palladium (Pd), gold (Au), nickel (Ni), neodymium (Nd), iridium (Ir), chromium (Cr), or a compound thereof, and a transparent or semitransparent electrode layer formed on the reflective layer. The transparent or semitransparent electrode layer may include indium tin oxide (ITO), indium zinc oxide (IZO), indium gallium zinc oxide (IGZO), zinc oxide (ZnO), indium oxide ($In_2O_3$), or aluminum doped zinc oxide (AZO).

The first cathode CE1 and the third cathode CE3 may be spaced apart from each other on the sixth insulating layer 60. At least a portion of the first cathode CE1 may be exposed by the first emission opening OP1 defined in the pixel defining layer PDL, and at least a portion of the third cathode CE3 may be exposed by the third emission opening OP3 defined in the pixel defining layer PDL.

The first cathode CE1 may be connected to the second connection electrode CNE2 through a contact hole penetrating the sixth insulating layer 60. The first cathode CE1 may be connected to the connection transistor Ta of the first pixel circuit PC1 (see FIG. 4A) through the first and second connection electrodes CNE1 and CNE2.

Although not illustrated in FIG. 5, the third cathode CE3 may be electrically connected to the connection transistor of the third pixel circuit PC3 (see FIG. 4A). Unlike the first cathode CE1, the third cathode CE3 may not overlap the connection transistor of the third pixel circuit PC3 (see FIG. 4A) in a plan view, and may be connected to the connection transistor of the third pixel circuit PC3 (see FIG. 4A) through connection electrodes connected to the third connection line CL3 (see FIG. 4A).

The first emission part EP1 and the third emission part EP3 may be arranged on the first cathode CE1 and the third cathode CE3, respectively. The first emission part EP1 and the third emission part EP3 each may include an organic light emitting material and/or inorganic light emitting material. For example, the first emission part EP1 and the third emission part EP3 each may include a fluorescent material, a phosphorescent material, an organometallic complex light emitting material, or quantum dots. In an embodiment, the first emission part EP1 may emit red light or green light, and the third emission part EP3 may emit blue light.

The anode AE of the first light emitting element LD1 and the anode AE of the third light emitting element LD3 may be a common electrode arranged and integrally connected on the first and third emission parts EP1 and EP3. The anode AE of the first light emitting element LD1 and the anode AE of the third light emitting element LD3 may be electrically connected to the first power supply voltage line PL1 (see FIG. 2), through which the first power supply voltage VDD (see FIG. 2) is applied, to receive the first power supply voltage VDD (see FIG. 2).

The first electron transport area EC1 of the first light emitting element LD1 may be arranged between the first cathode CE1 and the first emission part EP1. The third electron transport area EC3 of the third light emitting element LD3 may be arranged between the third cathode CE3 and the third emission part EP3. The first and third electron transport areas EC1 and EC3 each may include at least one of a hole blocking layer, an electron transport layer, or an electron injection layer.

The first hole transport area HC1 of the first light emitting element LD1 may be arranged between the first emission part EP1 and the anode AE. The third hole transport area HC3 of the third light emitting element LD3 may be arranged between the third emission part EP3 and the anode AE. The first and third hole transport areas HC1 and HC3 each may include at least one of an electron blocking layer, a hole transport layer, or a hole injection layer.

Therefore, the first and third light emitting elements LD1 and LD3 may have an inverted device structure in which the electronic transport areas EC1 and EC3 are arranged under the emission parts EP1 and EP3 and the hole transport areas HC1 and HC3 are arranged on the emission parts EP1 and EP3.

FIG. 5 illustrates a pattern form in which the electron transport areas EC1 and EC3, the emission parts EP1 and EP3, and the hole transport areas HC1 and HC3 are arranged in areas corresponding to the emission openings OP1 and OP3. For example, the electron transport areas EC1 and EC3, the emission parts EP1 and EP3, and the hole transport areas HC1 and HC3 each may be formed in correspondence with the emission openings OP1 and OP3 through a deposition and patterning process or inkjet printing process.

However, an embodiment of the invention is not limited thereto, and at least one of the electron transport areas EC1 and EC3, the emission parts EP1 and EP3, or the hole transport areas HC1 and HC3 may be provided as a common layer that is arranged on the pixel defining layer PDL and overlap pixels. For example, the first electron transport area EC1 and the third electron transport area EC3 may be provided in a form of an integrated film in which the first electron transport area EC1 and the third electron transport area EC3 are connected to each other.

Referring to FIG. 5, the connection transistor Ta, the first capacitor C1, and the second capacitor C2 may constitute the first pixel circuit PC1 (see FIG. 4A) electrically connected to the first light emitting element LD1. The first light emitting element LD1 may be arranged overlapping the connection transistor Ta and spaced apart from the first and second capacitors C1 and C2 in a plan view. That is, the first light emitting element LD1 may be arranged spaced apart from the first to third capacitor electrodes CP1, CP2, and CP3.

The first emission part EP1 may emit red light or green light, and when arranged on the first to third capacitor electrodes CP1, CP2, and CP3, may be affected by a step corresponding to an arrangement area of the first to third capacitor electrodes CP1, CP2, and CP3. However, since the first light emitting element LD1 of the invention is arranged spaced apart from the first to third capacitor electrodes CP1, CP2, and CP3, the first electron transport area EC1, the first emission part EP1, and the first hole transport area HC1 may be prevented from being arranged in an area having a large step, and the light emission efficiency of the first light emitting element LD1 may be improved.

That third light emitting element LD3 may be arranged overlapping the first to third capacitor electrodes CP1, CP2, and CP3 in a plan view. The third emission part EP3 may emit blue light, and may be less affected by a step corresponding to an arrangement area of the first to third capacitor electrodes CP1, CP2, and CP3. Therefore, even though the third light emitting element LD3 is arranged overlapping the first to third capacitor electrodes CP1, CP2, and CP3, the light emission efficiency of the third light emitting element LD3 may not significantly deteriorate.

The encapsulation layer TFE may be arranged on the light emitting elements LD1 and LD3 and seal the light emitting elements LD1 and LD3. The encapsulation layer TFE may include at least one thin film, and the thin film may be arranged to improve optical efficiency of the light emitting elements LD1 and LD3 or protect the light emitting elements LD1 and LD3.

In an embodiment, the encapsulation layer TFE may include a plurality of inorganic films and at least one organic film arranged between the inorganic films. The inorganic films may protect the light emitting elements LD1 and LD3 from moisture and/or oxygen. For example, the inorganic films may include at least one of aluminum oxide, titanium oxide, silicon oxide, silicon nitride, silicon oxynitride, zirconium oxide, or hafnium oxide. The organic film may protect the light emitting elements LD1 and LD3 from a foreign material such as dust particles. For example, the organic film may include an acrylic resin.

FIGS. 6A to 6G are plan views illustrating patterns constituting a pixel unit according to an embodiment of the invention.

The circuit layer DP-CL (see FIG. 5) may include a semiconductor layer and conductive layers. The semiconductor layer and the conductive layers each may include patterns arranged according to a predetermined rule in a plan view, and the patterns may constitute the first to third pixel circuits PC1, PC2, and PC3. FIGS. 6A to 6G illustrate plan views of the first to third pixel circuits PC1, PC2, and PC3 corresponding to the embodiment of FIG. 4A.

Figure 6A:
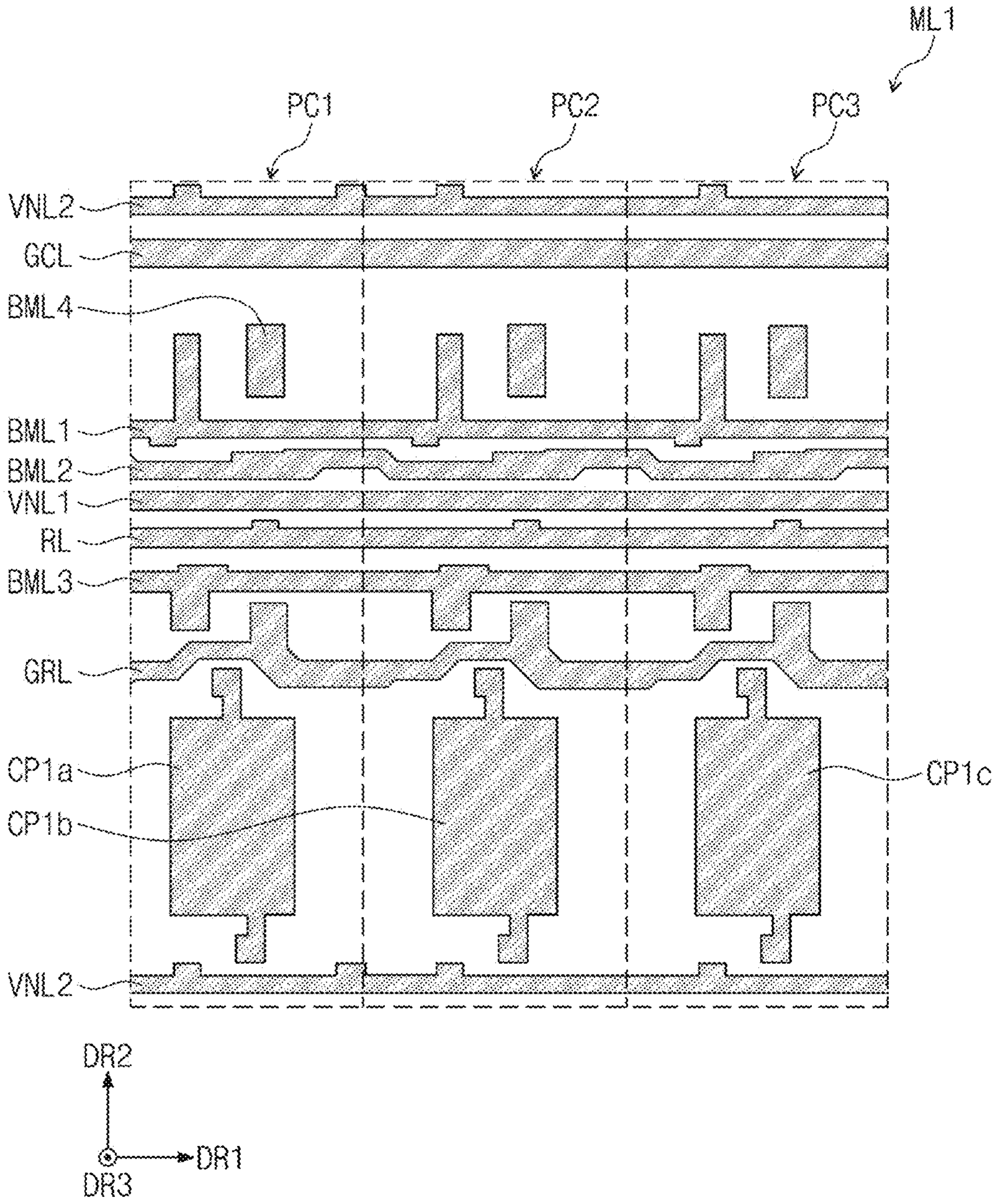
FIGS. 6A to 6G are plan views illustrating patterns constituting a pixel unit according to an embodiment of the invention.

Referring to FIG. 6A, a first conductive layer ML1 may include the first initialization voltage line VNL1, the second initialization voltage line VNL2, the reference voltage line RL, the compensation scan line GCL, the reset scan line GRL, lower metal parts BML1 to BML4, and first capacitor electrodes CP1*a*, CP1*b*, and CP1*c*. The first conductive layer ML1 may be arranged on the base layer BS (see FIG. 5).

The first initialization voltage line VNL1, the second initialization voltage line VNL2, the reference voltage line RL, the compensation scan line GCL, and the reset scan line GRL each may be arranged extending in the first direction DR1. The first initialization voltage line VNL1, the second initialization voltage line VNL2, the reference voltage line RL, the compensation scan line GCL, and the reset scan line GRL may be arranged spaced apart from each other in the second direction DR2.

The first initialization voltage line VNL1 may receive the initialization voltage VINT (see FIG. 2), the second initialization voltage line VNL2 may receive the compensation initialization voltage VCINT (see FIG. 2), and the reference voltage line RI, may receive the reference voltage VREF (see FIG. 2). The compensation scan line GCL may receive the compensation scan signal GC (see FIG. 2), and the reset scan line GRL may receive the reset scan signal GR (see FIG. 2).

The lower metal parts BML1 to BML4 may be arranged under the transistors T1 to T8 (see FIG. 6C) to protect the transistors T1 to T8. A portion of the first lower metal part BML1 of FIG. 6A may correspond to the lower metal part BML of FIG. 5.

The lower metal parts BML1 to BML4 may be arranged spaced apart from each other. FIG. 6A illustrates, as an example, the first to third lower metal parts BML1 to BML3 having a form of an extending line and the fourth lower metal part BML4 having a form of an island. However, shapes of the lower metal parts BML1 to BML4 are not limited to those illustrated in FIG. 6A provided that the lower metal parts BML1 to BML4 are arranged under the transistors T1 to T8 (see FIG. 6C).

The first capacitor electrodes CP1*a*, CP1*b*, and CP1*c* may be electrodes that are arranged spaced apart from each other and have a predetermined area size. The area size of the first capacitor electrodes CP1*a*, CP1*b*, and CP1*c* may affect capacitance of the first capacitor C1 (see FIG. 5) to be formed through the first capacitor electrodes CP1*a*, CP1*b*, and CP1*c*. The first capacitor electrodes CP1*a*, CP1*b*, and CP1*c* of the first to third pixel circuits PC1, PC2, and PC3 may be arranged along the first direction DR1. The first capacitor electrode CP1*a* of the first pixel circuit PC1 among the first capacitor electrodes CP1*a*, CP1*b*, and CP1*c* may correspond to the first capacitor electrode CP1 of FIG. 5.

Figure 6B:
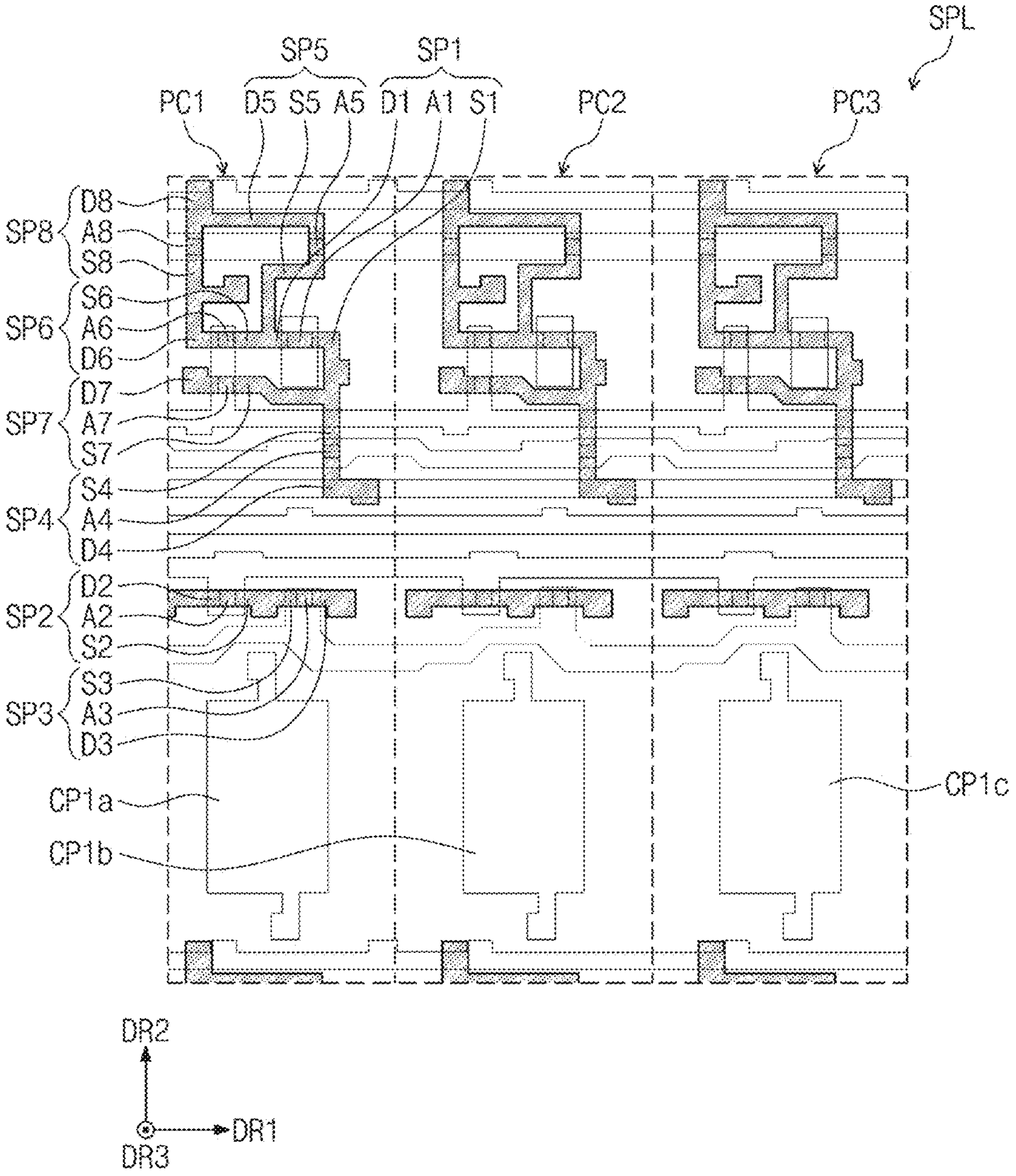
Figure 6C:
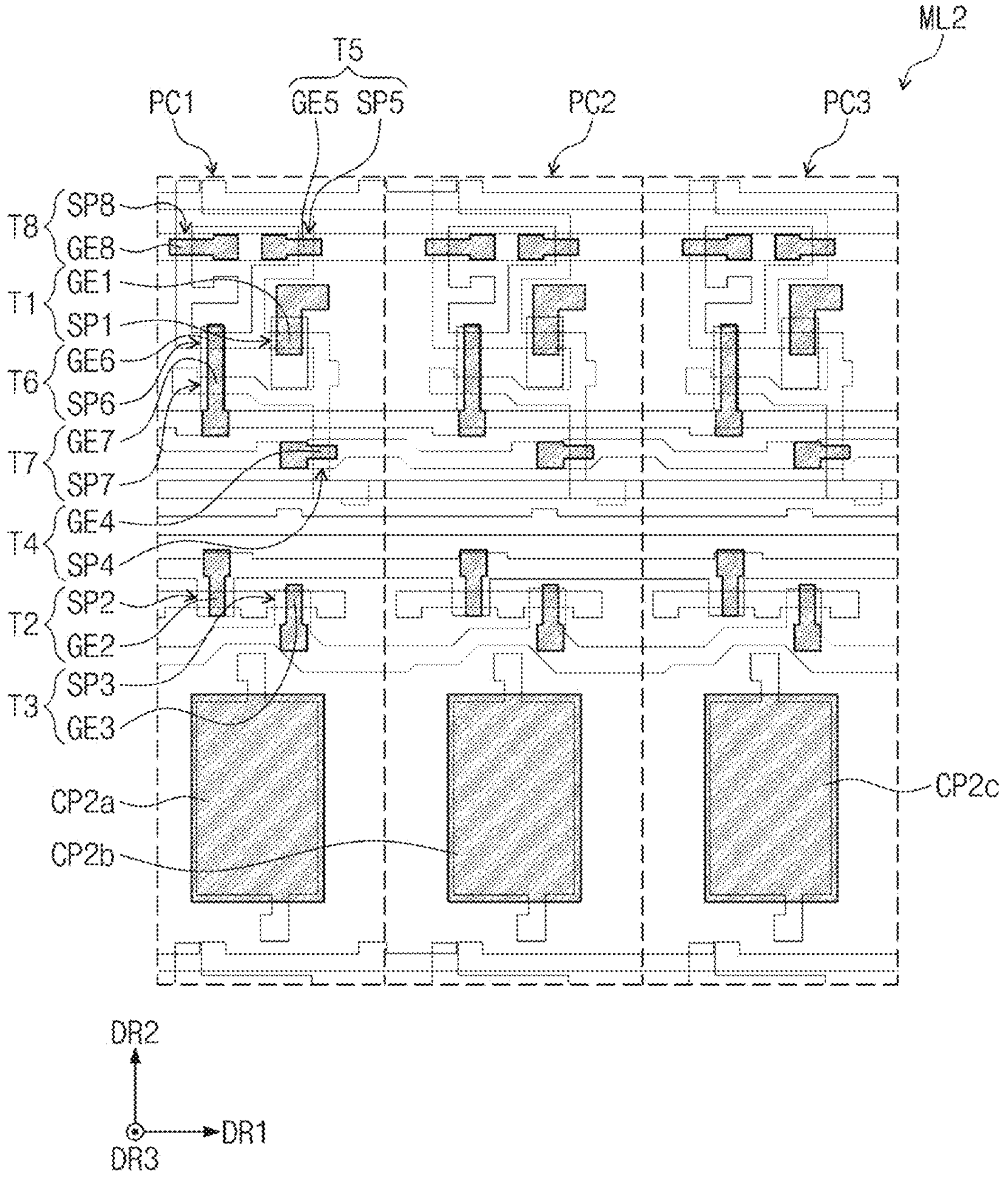

Referring to FIG. 6B, a semiconductor layer SPL may include first to eighth semiconductor patterns SP1 to SP8. The semiconductor layer SPL may be arranged on the first conductive layer ML1 (see FIG. 6A). For example, the first to eighth semiconductor patterns SP1 to SP8 may be arranged on the first insulating layer 10 of FIG. 5.

The first to eighth semiconductor patterns SP1 to SP8 of the first to third pixel circuits PC1, PC2, and PC3 may have substantially the same shape.

The first to eighth semiconductor patterns SP1 to SP8 each may include an oxide semiconductor. However, an embodiment of the invention is not limited thereto, and the first to eighth semiconductor patterns SP1 to SP8 each may include a silicon semiconductor.

The first to eighth semiconductor patterns SP1 to SP8 may include sources S1 to S8, drains D1 to D8, and channels A1 to A8. The channels A1 to A8 of the first to eighth semiconductor patterns SP1 to SP8 may be arranged between the sources S1 to S8 and drains D1 to D8 forming semiconductor patterns.

In the semiconductor layer SPL, the second and third semiconductor patterns SP2 and SP3 may be arranged spaced apart from the other semiconductor patterns SP1 and SP4 to SP8 in a plan view. The source S2 of the second semiconductor pattern SP2 and the source S3 of the third semiconductor pattern SP3 may be integrally connected to each other.

The source S1 of the first semiconductor pattern SP1 may be connected to the source S4 of the fourth semiconductor pattern SP4, and the drain D1 of the first semiconductor pattern SP1 may be connected to the source S6 of the sixth semiconductor pattern SP6. The drain D6 of the sixth semiconductor pattern SP6 may be connected to the source S8 of the eighth semiconductor pattern SP8. The drain D8 of the eighth semiconductor pattern SP8 may be connected to the fifth drain D5 of the fifth semiconductor pattern SP5.

The first to eighth semiconductor patterns SP1 to SP8 may overlap the first conductive layer ML1 (see FIG. 6A) arranged thereunder, and light incident from below the first to eighth semiconductor patterns SP1 to SP8 may be blocked by the first conductive layer ML1 (see FIG. 6A), thus protecting the first to eighth semiconductor patterns SP1 to SP8. For example, the first semiconductor pattern SP1 may overlap the fourth lower metal part BML4 (see FIG. 6A), the second semiconductor pattern SP2 may overlap the third lower metal part BML3 (see FIG. 6A), the third semiconductor pattern SP3 may over the reset scan line GRL (see FIG. 6A), the fourth semiconductor pattern SP4 may overlap the second lower metal part BML2 (see FIG. 6A), the fifth semiconductor pattern SP5 and the eighth semiconductor pattern SP8 may overlap the compensation scan line GCL (see FIG. 6A), and the sixth semiconductor pattern SP6 and the seventh semiconductor pattern SP7 may overlap the first lower metal part BML1 (see FIG. 6A) in a plan view.

Referring to FIG. 6A, a second conductive layer ML2 may include gate electrodes GE1 to GE8 and second capacitor electrodes CP2*a*, CP2*b*, and CP2*c*. The second conductive layer ML2 may be arranged on the semiconductor layer SPL (see FIG. 6B). For example, the second conductive layer ML2 may be arranged on the second insulating layer 20 of FIG. 5.

The first to eighth gate electrodes GE1 to GE8 may be electrodes having a form of an island. The first to eighth gate electrodes GE1 to GE8 of the first to third pixel circuits PC1, PC2, and PC3 may have substantially the same shape.

The first to eight gate electrodes GE1 to GE8 and the first to eighth semiconductor patterns SP1 to SP8 which overlap each other, respectively, may constitute the first to eighth transistors T1 to T8, respectively. The first to eighth transistors T1 to T8 may correspond to the first to eighth transistors T1 to T8 of FIG. 2.

The first to eighth gate electrodes GE1 to GE8 may be arranged overlapping the first to eighth channels A1 to A8 (see FIG. 6B), respectively in a plan view. The first to eighth gate electrodes GE1 to GE8 may function as a mask during a reduction or doping process of the first to eighth semiconductor patterns SP1 to SP8.

The sixth gate electrode GE6 and the seventh gate electrode GE7 which are electrically connected to each other, among the first to eighth gate electrodes GE1 to GE8, may be provided as an integrated electrode. However, an embodiment of the invention is not limited thereto, and the sixth gate electrode GE6 and the seventh gate electrode GE7 may be connected to each other through an additional conductive pattern arranged on a different layer.

The second capacitor electrodes CP2*a*, CP2*b*, and CP2*c* may be electrodes that are arranged spaced apart from each other and have a predetermined area size. The second capacitor electrodes CP2*a*, CP2*b*, and CP2*c* may be arranged overlapping the first capacitor electrodes CP1*a*, CP1*b*, and CP1*c* (see FIG. 6A), respectively in a plan view, and may form the first capacitor C1 (see FIG. 2). Area sizes of the first capacitor electrodes CP1*a*, CP1*b*, and CP1*c* (see FIG. 6A) and second capacitor electrodes CP2*a*, CP2*b*, and CP2*c* which overlap each other, respectively, may affect the capacitance of the first capacitor C1 (see FIG. 2).

The second capacitor electrodes CP2*a*, CP2*b*, and CP2*c* of the first to third pixel circuits PC1, PC2, and PC3 may be arranged along the first direction DR1. The second capacitor electrode CP2*a* of the first pixel circuit PC1 among the second capacitor electrodes CP2*a*, CP2*b*, and CP2*c* may correspond to the second capacitor electrode CP2 of FIG. 5.

Figure 6D:
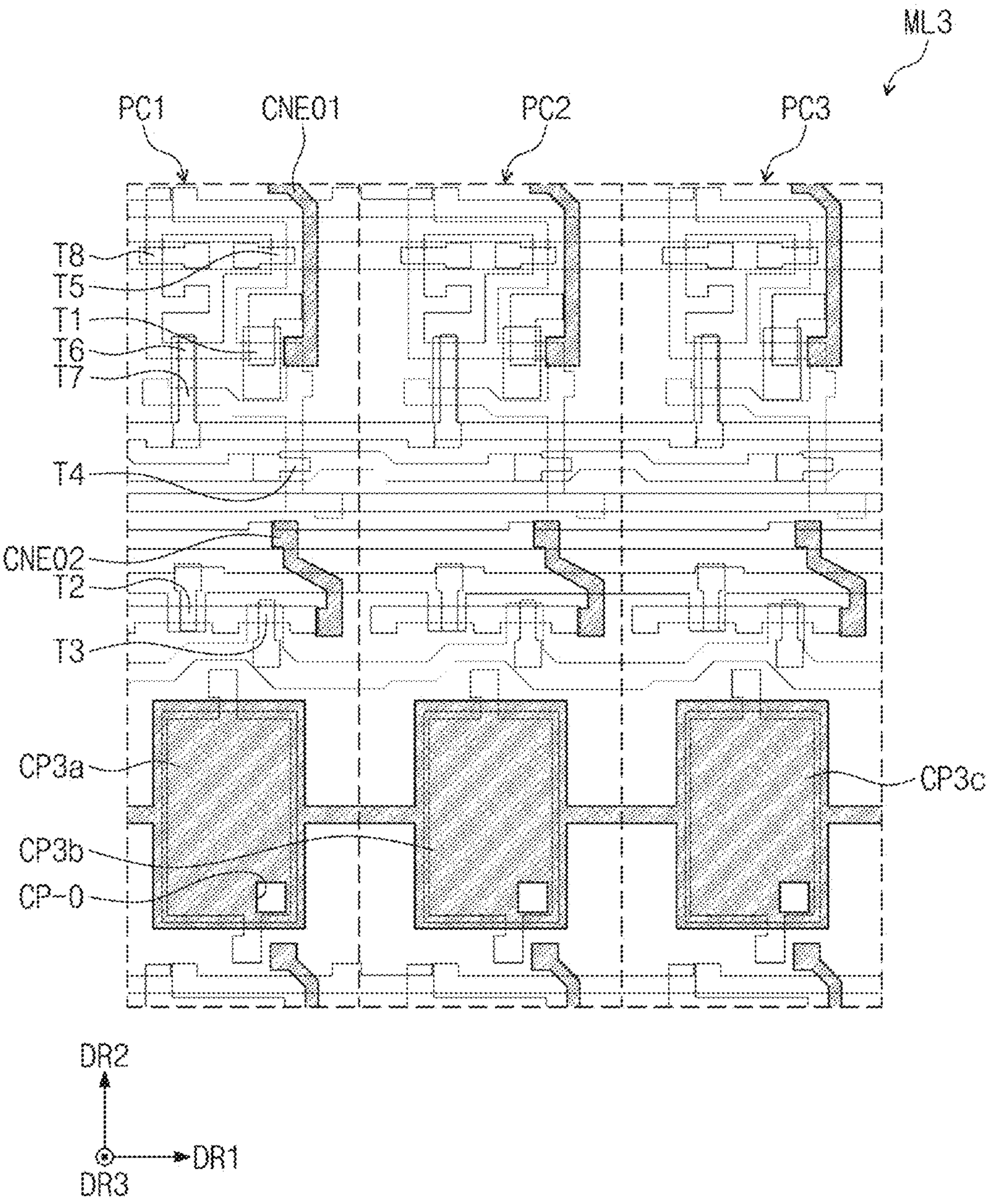

Referring to FIG. 6D, a third conductive layer ML3 may include connection patterns CNE01 and CNE02 and third capacitor electrodes CP3*a*, CP3*b*, and CP3*c*. The third conductive layer ML3 may be arranged on the second conductive layer ML2 (see FIG. 6C). For example, the third conductive layer ML3 may be arranged on the third insulating layer 30 of FIG. 5.

The connection patterns CNE01 and CNE02 may assist in electrically connecting elements in the pixel circuits PC1, PC2, and PC3. The elements that are electrically connected through the connection patterns CNE01 and CNE02 will be described later with reference to the drawings.

The third capacitor electrodes CP3*a*, CP3*b*, and CP3*c* may be electrodes having a predetermined area size. The third capacitor electrodes CP3*a*, CP3*b*, and CP3*c* may be arranged overlapping the second capacitor electrodes CP2*a*, CP2*b*, and CP2*c* (see FIG. 6C), respectively in a plan view, and may form the second capacitor C2 (see FIG. 2). Area sizes of the second capacitor electrodes CP2*a*, CP2*b*, and CP2*c* (see FIG. 6C) and third capacitor electrodes CP3*a*, CP3*b*, and CP3*c* which overlap each other may affect the capacitance of the second capacitor C2 (see FIG. 2).

An electrode opening CP—O may be defined in each of the third capacitor electrodes CP3*a*, CP3*b*, and CP3*c*. The electrode openings CP—O may expose certain portions of the second capacitor electrodes CP2*a*, CP2*b*, and CP2*c*, respectively (see FIG. 6C). The certain portions of the second capacitor electrodes CP2*a*, CP2*b*, and CP2*c* (see FIG. 6C) exposed by the electrode openings CP—O may be portions connected to the connection electrodes described below.

The third capacitor electrodes CP3*a*, CP3*b*, and CP3*c* of the first to third pixel circuits PC1, PC2, and PC3 may be arranged along the first direction DR1 and connected to each other. The third capacitor electrodes CP3*a*, CP3*b*, and CP3*c* each may be connected to the second power supply voltage line PL2 (see FIG. 6F) receiving the second power supply voltage VSS (see FIG. 2), and since the third capacitor electrodes CP3*a*, CP3*b*, and CP3*c* are connected to each other, the second power supply voltage VSS (see FIG. 2) that is a constant voltage may be uniformly applied to the third capacitor electrodes CP3*a*, CP3*b*, and CP3*c*. The third capacitor electrode CP3*a* of the first pixel circuit PC1 among the third capacitor electrodes CP3*a*, CP3*b*, and CP3*c* may correspond to the third capacitor electrode CP3 of FIG. 5.

Figure 6E:
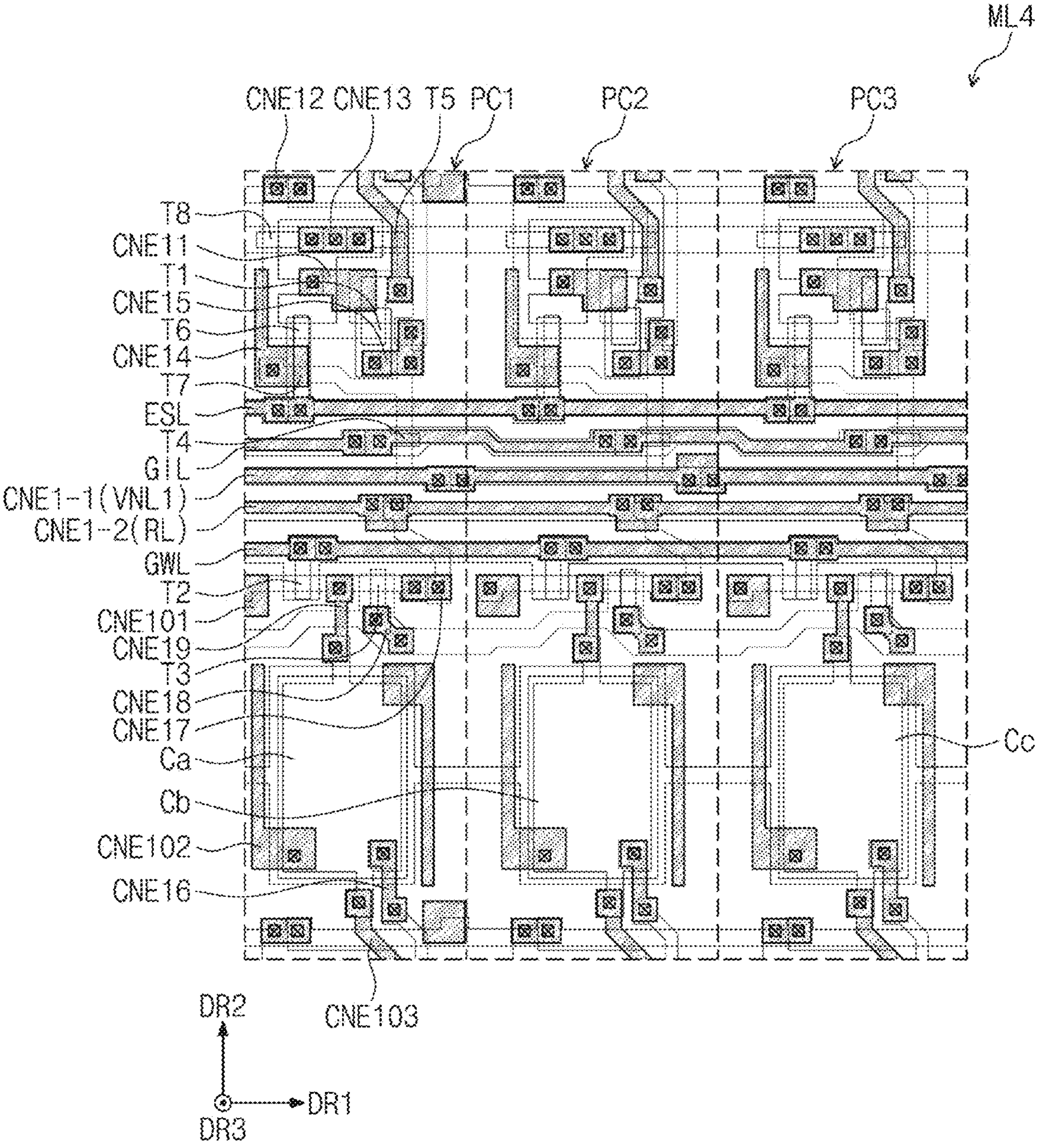

Referring to FIG. 6E, a fourth conductive layer ML4 may include first connection electrodes CNE11 to CNE19 and CNE101 to CNE103, upper metal parts CNE1-1 and CNE1-2, the emission control line ESL, the data scan line GWL, and the initialization scan line GIL. The fourth conductive layer ML4 may be arranged on the third conductive layer ML3 (see FIG. 6D). For example, the fourth conductive layer ML4 may be arranged on the fourth insulating layer 40 of FIG. 5.

Portions in which the first to third capacitor electrodes CP1*a* to CP1*c*, CP2*a* to CP2*c*, and CP3*a* to CP3*b* are arranged in the first to third pixel circuits PC1, PC2, and PC3 may be defined as the first to third capacitor parts Ca, Cb, and Cc described above, and, for convenience, the first to third capacitor parts Ca, Cb, and Cc are illustrated in FIG. 6E and the following figures.

The emission control line ESL, the data scan line GWL, and the initialization scan line GIL each may extend in the first direction DR1. The emission control line ESL, the data scan line GWL, and the initialization scan line GIL may be arranged spaced apart from each other in the second direction DR2.

The emission control line ESL may receive the emission control signal EM (see FIG. 2). The data scan line GWL may receive the scan signal GW (see FIG. 2), and the initialization scan line GIL may receive the initialization scan signal GI (see FIG. 2).

The emission control line ESL may overlap the first lower metal part BML1 (see FIG. 6A) in a plan view and may be connected thereto through a contact part. The emission control signal EM (see FIG. 2) applied to the emission control line ESL may also be applied to the first lower metal part BML1 (see FIG. 6A). The initialization scan line GIL may overlap the second lower metal part BML2 (see FIG. 6A) and may be connected thereto through a contact part, and the second lower metal part BML2 (see FIG. 6A) may also receive the initialization scan signal GI (see FIG. 2). The data scan line GWL may overlap the third lower metal part BML3 (see FIG. 6A) and may be connected thereto through a contact part, and the third lower metal part BML3 (see FIG. 6A) may also receive the scan signal GI (see FIG. 2). However, an embodiment of the invention is not necessarily limited thereto.

The first and second upper metal parts CNE1-1 and CNE1-2 may have a form of a line extending in the first direction DR1. The first upper metal part CNE1-1 may overlap the first initialization voltage line VNL1 in a plan view and may be connected thereto through a contact part. The compensation initialization voltage VCINT (see FIG. 2) may be applied to the first upper metal part CNE1-1. The second upper metal part CNE1-2 may overlap the reference voltage line RL and may be connected thereto through a contact part. The reference volage VREF (see FIG. 2) may be applied to the second upper metal part CNE1-2. However, an embodiment of the invention is not necessarily limited thereto.

The first connection electrodes CNE11 to CNE19 and CNE101 to CNE103 may be arranged spaced apart from each other in the fourth conductive layer ML4, and may connect elements that are desirable to be electrically connected. The first connection electrodes CNE11 to CNE19 and CNE101 to CNE103 of the first to third pixel circuits PC1, PC2, and PC3 may have substantially the same shape. Hereinafter, the first connection electrodes CNE11 to CNE19 and CNE101 to CNE103 are all referred to as a first connection electrode, and differentially described through reference numerals.

A portion in which the sixth transistor T6 and the eighth transistor T8 are connected may correspond to the third node ND3 (see FIG. 2), and the third node ND3 (see FIG. 2) may be connected to the first connection electrode CNE11. This may be a connection electrode electrically connected to the cathodes described below.

The eighth transistor T8 and the second initialization voltage line VNL2 (see FIG. 6A) may be electrically connected through the first connection electrode CNE12. The eighth gate electrode GE8 (see FIG. 6C) of the eighth transistor T8 and the fifth gate electrode GE5 (see FIG. 6C) of the fifth transistor T5 which are spaced apart from each other in the second conductive layer ML2 (see FIG. 6C) may be electrically connected through the first connection electrode CNE13.

The seventh transistor T7 may be connected to the first connection electrode CNE14. The seventh transistor T7 may be electrically connected to the second power supply voltage line PL2 (see FIG. 6F) through the first connection electrode CNE14.

The fourth transistor T4 and the second capacitor electrode CP2*a* (see FIG. 6C) may be connected to the first connection electrodes CNE15 and CNE16, respectively. The first connection electrode CNE16 may be connected to the second capacitor electrode CP2*a* (see FIG. 6C) through the electrode opening CP—O (see FIG. 6D) of the third capacitor electrode CP3*a* (see FIG. 6D). The first connection electrodes CNE15 and CNE16 connected to the fourth transistor T4 and the second capacitor electrode CP2*a* (see FIG. 6C), respectively, may be arranged spaced apart from each other in the fourth conductive layer ML4 and may be electrically connected through the connection pattern CNE01 (see FIG. 6D). That is, the fourth transistor T4 and the second capacitor electrode CP2*a* (see FIG. 6C) may be electrically connected to each other through the first connection electrodes CNE15 and CNE16 and the connection pattern CNE01 (see FIG. 6D).

The third transistor T3 may be connected to the first connection electrode CNE17. The first connection electrode CNE17 connected to the third transistor T3 may be electrically connected to the connection pattern CNE02 (see FIG. 6D) connected to the second upper metal part CNE1-2 and the reference voltage line RL. That is, the third transistor T3 may be electrically connected to the reference voltage line RL through the first connection electrode CNE17 and the connection pattern CNE02 (see FIG. 6D). The third gate electrode GE3 (see FIG. 6C) of the third transistor T3 may be electrically connected to the reset scan line GRL (see FIG. 6A) through the first connection electrode CNE18.

A portion in which the second transistor T2 and the third transistor T3 are connected may correspond to the first node ND1 (see FIG. 2), and the first node ND1 (see FIG. 2) may be connected to the first capacitor electrode CP1*a* (see FIG. 6A) through the first connection electrode CNE19. The second transistor T2 may be connected to the first connection electrode CNE101, and may be electrically connected to the data line DL (see FIG. 6F) through the first connection electrode CNE101.

The third capacitor electrode CP3*a* (see FIG. 6D) may be connected to the first connection electrode CNE102, and may be electrically connected to the second power supply voltage line PL2 (see FIG. 6F) through the first connection electrode CNE102.

The first gate electrode GE1 (see FIG. 6C) of the first transistor T1 may be electrically connected to the first capacitor electrode CP1*a* (see FIG. 6A) through the first connection electrode CNE13.

Figure 6F:
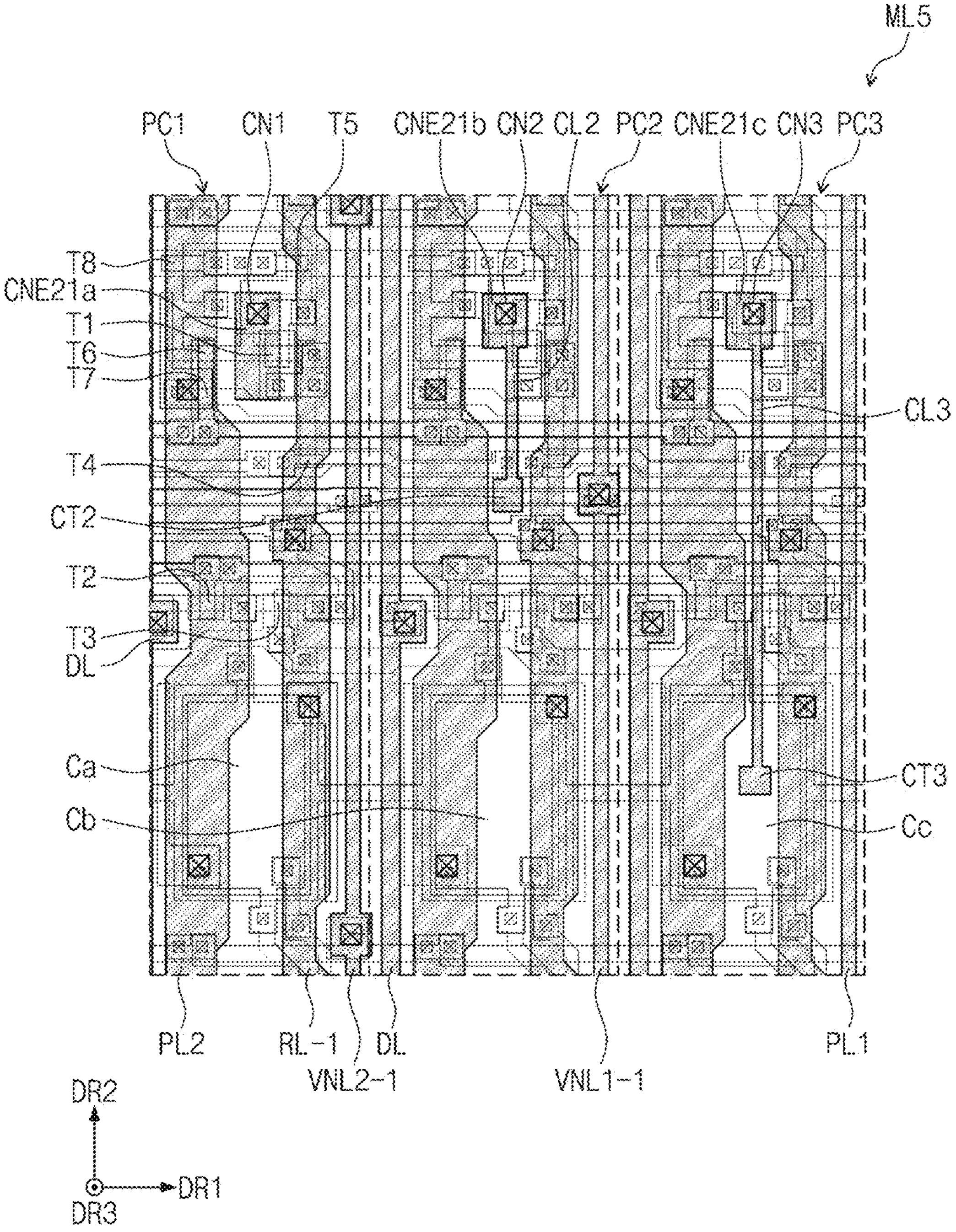

Referring to FIG. 6F, a fifth conductive layer ML5 may include the first power supply voltage line PL1, the second power supply voltage line PL2, the data line DL, a first sub initialization voltage line VNL1-1, a second sub initialization voltage line VNL2-1, a sub reference voltage line RL-1, and second connection electrodes CNE21*a*, CNE21*b*, and CNE21*c*. The fifth conductive layer ML5 may be arranged on the fourth conductive layer ML4 (see FIG. 6E). For example, the fifth conductive layer ML5 may be arranged on the fifth insulating layer 50 of FIG. 5.

The first power supply voltage line PL1, the second power supply voltage line PL2, and the data line DL each may extend in the second direction DR2. The first power supply voltage line PL1, the second power supply voltage line PL2, and the data line DL may be arranged spaced apart from each other in the first direction DR1.

The first power supply voltage line PL1 may receive the first power supply voltage VDD (see FIG. 2). The first power supply voltage line PL1 may be electrically connected to the anode AE (see FIG. 5) of the light emitting elements LD1 to LD3 (see FIGS. 4A and 5) and may apply the first power supply voltage VDD (see FIG. 2) to the anode AE (see FIG. 5).

The second power supply voltage line PL2 may receive the second power supply voltage VSS (see FIG. 2). The second power supply voltage line PL2 may be electrically connected to the seventh transistor T7 and the third capacitor electrode CP3*a* (see FIG. 6D) through the first connection electrodes CNE14 and CNE102 (see FIG. 6E).

The data line DL may receive the data signal DW (see FIG. 2). The data line DL may be electrically connected to the second transistor T2 through the first connection electrode CNE101 (see FIG. 6E).

The first sub initialization voltage line VNL1-1, the second sub initialization voltage line VNL2-1, and the sub reference voltage line RL-1 each may extend in the second direction DR2. The first sub initialization voltage line VNL1-1, the second sub initialization voltage line VNL2-1, and the sub reference voltage line RL-1 may be arranged spaced apart from each other in the first direction DR1.

The first sub initialization voltage line VNL1-1 may be electrically connected to the first initialization voltage line VNL1 (see FIG. 6A) extending in the first direction DR1. The second sub initialization voltage line VNL2-1 may be electrically connected to the second initialization voltage line VNL2 (see FIG. 6A) extending in the first direction DR1. The sub reference voltage line RL-1 may be electrically connected to the reference voltage line RL (see FIG. 6A) extending in the first direction DR1.

The second connection electrodes CNE21*a*, CNE21*b*, and CNE21*c* of the first to third pixel circuits PC1, PC2, and PC3 may be spaced apart from each other in the first direction DR1.

The second connection electrode CNE21*a* of the first pixel circuit PC1 may be electrically connected to the sixth transistor T6 through the first connection electrode CNE11 (see FIG. 6E) connected to the sixth transistor T6 of the first pixel circuit PC1. Portions of the first connection electrode CNE11 (see FIG. 6E) and second connection electrode CNE21*a* connected to the sixth transistor T6 in the first pixel circuit PC1 may correspond to the first circuit connection part CN1.

The second connection electrode CNE21*b* of the second pixel circuit PC2 may be electrically connected to the sixth transistor T6 through the first connection electrode CNE11 (see FIG. 6E) connected to the sixth transistor T6 of the second pixel circuit PC2. Portions of the first connection electrode CNE11 (see FIG. 6E) and second connection electrode CNE21*b* connected to the sixth transistor T6 in the second pixel circuit PC2 may correspond to the second circuit connection part CN2.

One portion of the second connection electrode CEN21*b* of the second pixel circuit PC2 may be connected to the second cathode CE2 (see FIG. 6G) described below, and this portion may correspond to the second emission connection part CT2. In the second pixel circuit PC2, the second circuit connection part CN2 and the second emission connection part CT2 may be spaced apart in the second direction DR2 and may be connected through the second connection line CL2. That is, the second connection electrode CNE21*b* of the second pixel circuit PC2 may include the second circuit connection part CN2 and the second emission connection part CT2, which are spaced apart in the second direction DR2, and the second connection line CL2 connecting the second circuit connection part CN2 and the second emission connection part CT2.

The third connection electrode CNE21*c* of the third pixel circuit PC3 may be electrically connected to the sixth transistor T6 through the first connection electrode CNE11 (see FIG. 6E) connected to the sixth transistor T6 of the third pixel circuit PC3. Portions of the first connection electrode CNE11 (see FIG. 6E) and second connection electrode CNE21*c* connected to the sixth transistor T6 in the third pixel circuit PC3 may correspond to the third circuit connection part CN3.

One portion of the second connection electrode CEN21*c* of the third pixel circuit PC3 may be connected to the third cathode CE3 (see FIG. 6G) described below, and this portion may correspond to the third emission connection part CT3. In the third pixel circuit PC3, the third circuit connection part CN3 and the third emission connection part CT3 may be spaced apart in the second direction DR2 and may be connected through the third connection line CL3. That is, the second connection electrode CNE21*c* of the third pixel circuit PC3 may include the third circuit connection part CN3 and the third emission connection part CT3, which are spaced apart in the second direction DR2, and the third connection line CL3 connecting the third circuit connection part CN3 and the third emission connection part CT3.

Figure 6G:
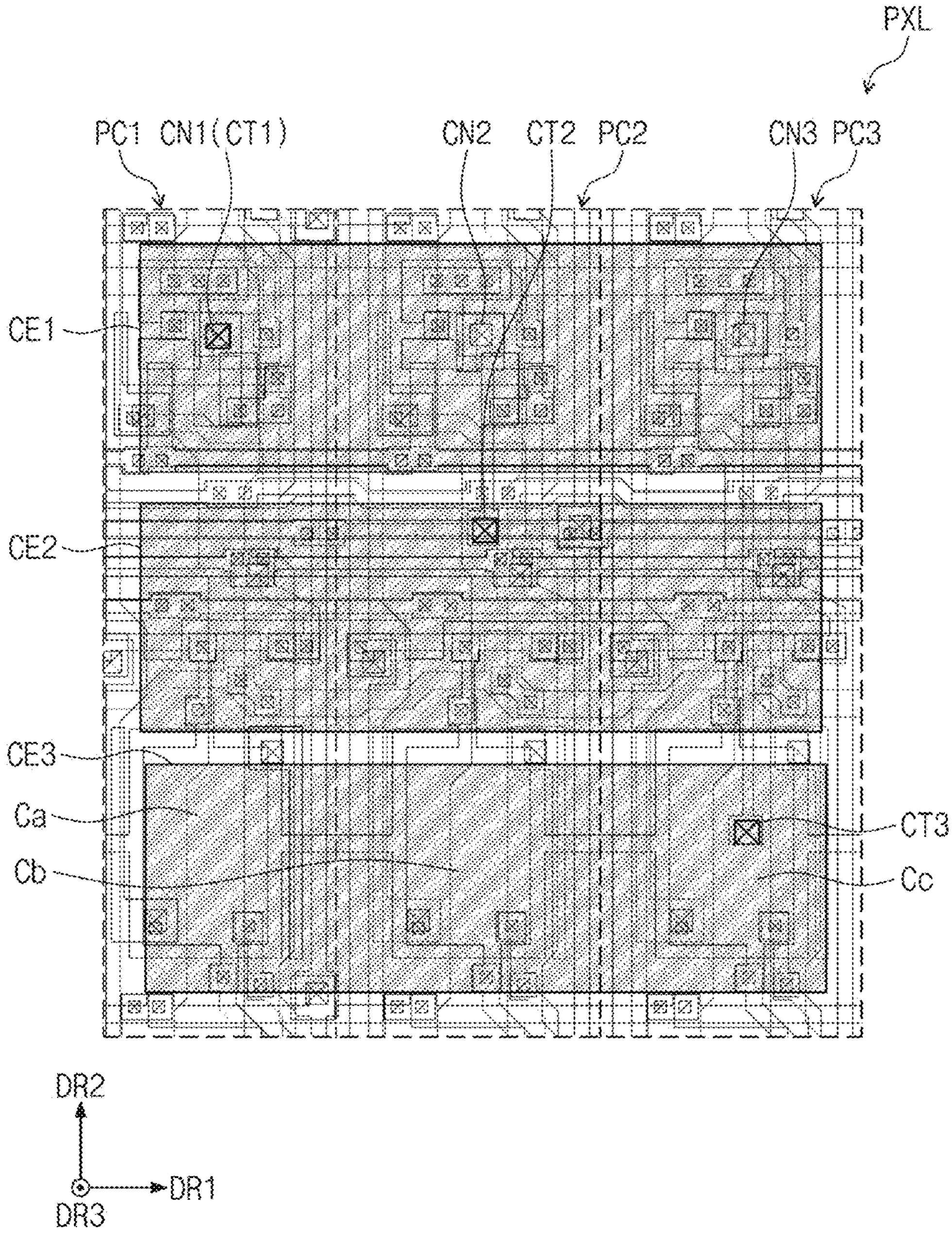

Referring to FIG. 6G, a pixel electrode layer PXL may be arranged on the fifth conductive layer ML5 (see FIG. 6F). The pixel electrode layer PXL may be one element of the display element layer DP-LL (see FIG. 5) and may be arranged on the circuit layer DP-CL (see FIG. 5). For example, the pixel electrode layer PXL may be arranged on the sixth insulating layer 60 of FIG. 5.

The pixel electrode layer PXL may include the first to third cathodes CE1, CE2, and CE3 constituting the first to third light emitting elements LD1 to LD3 (see FIGS. 4A and 5), respectively. An area in which the first to third cathodes CE1, CE2, and CE3 are arranged may correspond to an area in which the first to third light emitting elements LD1, LD2, and LD3 (see FIGS. 4A and 5) are arranged.

The first to third cathodes CE1, CE2, and CE3 each may extend in the first direction DR1. The first to third cathodes CE1, CE2, and CE3 may be arranged spaced apart from each other along the second direction DR2.

The first cathode CE1 may overlap both the first circuit connection part CN1 and the first emission connection part CT1 in a plan view. The first cathode CE1 may overlap the sixth transistor T6 (see FIG. 6E) of the first pixel circuit PC1 corresponding to the connection transistor of the first pixel circuit PC1. The first cathode CE1 may also overlap the sixth transistors T6 (see FIG. 6E) of the second and third pixel circuits PC2 and PC3.

The first pixel circuit PC1 formed in an area extending in the second direction DR2 and the first cathode CE1 extending in the first direction DR1 may only partially overlap each other in a plan view. Therefore, the first cathode CE1 may be spaced apart from the capacitor part Ca of the first pixel circuit PC1 in a plan view. That is, the first cathode CE1 may be spaced apart from the first to third capacitor electrodes CP1*a*, CP2*a*, and CP3*a* (see FIGS. 6A, 6C, and 6D) of the first pixel circuit PC1. The first cathode CE1 may also be spaced apart from the capacitor parts Cb and Cc of the second and third pixel circuits PC2 and PC3 in a plan view.

The second cathode CE2 may be spaced apart from the second circuit connection part CN2 in a plan view. That is, the second cathode CE2 may be spaced apart from the sixth transistor T6 (see FIG. 6E) of the second pixel circuit PC2 corresponding to the connection transistor of the second pixel circuit PC2 in a plan view. One portion of the second connection electrode CNE21*b* (see FIG. 6F) of the second pixel circuit PC2, which overlaps the second cathode CE2 and is connected to the second cathode CE2, may correspond to the second emission connection part CT2.

The second pixel circuit PC2 formed in an area extending in the second direction DR2 and the second cathode CE2 extending in the first direction DR1 may only partially overlap each other in a plan view. Therefore, the second cathode CE2 may be spaced apart from the capacitor part Cb of the second pixel circuit PC2 in a plan view. That is, the second cathode CE2 may be spaced apart from the first to third capacitor electrodes CP1*b*, CP2*b*, and CP3*b* (see FIGS. 6A, 6C, and 6D) of the second pixel circuit PC2. The second cathode CE2 may also be spaced apart from the capacitor parts Ca and Cc of the first and third pixel circuits PC1 and PC3 in a plan view.

The third cathode CE3 may be spaced apart from the third circuit connection part CN3 in a plan view. That is, the third cathode CE3 may be spaced apart from the sixth transistor T6 (see FIG. 6E) of the third pixel circuit PC3 corresponding to the connection transistor of the third pixel circuit PC3 in a plan view. One portion of the second connection electrode CNE21*c* (see FIG. 6F) of the third pixel circuit PC3, which overlaps the third cathode CE3 in a plan view and is connected to the third cathode CE3, may correspond to the third emission connection part CT3.

The third cathode CE3 extending in the first direction DR1 may overlap the capacitor parts Ca, Cb, and Cc of the first to third pixel circuits PC1, PC2, and PC3. The third cathode CE3 may be one element of the third light emitting element LD3 (see FIGS. 4A and 5) that emits blue light. The third light emitting element LD3 (see FIGS. 4A and 5) may be least affected by a step formed between an area in which the capacitor parts Ca, Cb, and Cc are arranged and another area in which the capacitor parts Ca, Cb, and Cc are not arranged, and the third cathode CE3 may be arranged on the capacitor parts Ca, Cb, and Cc so that the third light emitting element LD3 (see FIGS. 4A and 5) overlap the capacitor parts Ca, Cb, and Cc in a plan view.

When the first and second light emitting elements LD1 and LD2 which emit red light or green light are arranged overlapping at least one of the capacitor parts Ca, Cb, and Cc, the light emission efficiency may deteriorate due to a step formed between an area in which the capacitor parts Ca, Cb, and Cc are arranged and another area in which the capacitor parts Ca, Cb, and Cc are not arranged. Therefore, the first and second cathodes CE1 and CE2 may be arranged spaced apart from the capacitor parts Ca, Cb, and Cc so that the first and second light emitting elements LD1 and LD2 (see FIG. 4A) do not overlap the capacitor parts Ca, Cb, and Cc in a plan view.

A display panel according to an embodiment of the invention includes a circuit part including capacitor electrodes arranged so as to have a predetermined area size in one area. A portion of light emitting elements according to an embodiment of the invention is arranged so as not to overlap the capacitor electrodes in a plan view, and another portion is arranged so as to overlap the capacitor electrodes in a plan view according to color of output light. In this manner, deterioration of light emission efficiency of the light emitting elements due to a step formed between an area in which the capacitor electrodes are arranged and another area in which the capacitor electrodes are not arranged may be minimized, and a display panel may have improved light emission efficiency.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A display panel comprising:

a base layer; and first to third pixels, which emit different color lights from each other and are disposed on the base layer, and each of which includes a pixel circuit and a light emitting element, wherein the pixel circuit comprises:

a connection transistor electrically connected to the light emitting element;

a first capacitor formed by a first capacitor electrode and a second capacitor electrode, which overlap each other; and a second capacitor formed by the second capacitor electrode and a third capacitor electrode, which overlap each other, wherein the light emitting elements of the first and second pixels are spaced apart from the first to third capacitor electrodes of the first to third pixels in a plan view, the light emitting element of the third pixel overlaps the first to third capacitor electrodes of the first to third pixels in the plan view, the light emitting element of the first pixel completely overlaps the connection transistor of the pixel circuit of the first pixel in the plan view, and the different color lights are each emitted in a direction away from the base layer and the connection transistor the first pixel circuit.

2. The display panel of claim 1, wherein the pixel circuits of the first to third pixels are arranged along a first direction, and the light emitting elements of the first to third pixels are arranged along a second direction intersecting the first direction.

3. The display panel of claim 1, wherein the pixel circuits of the first to third pixels are arranged along a first direction, the light emitting elements of the first and second pixels are arranged along the first direction, and the light emitting element of the third pixel is arranged with the light emitting elements of the first and second pixels along a second direction intersecting the first direction.

4. The display panel of claim 1, wherein the first to third pixels emit red light, green light, and blue light, respectively.

5. The display panel of claim 1, wherein the light emitting element of each of the first to third pixels includes a cathode, an emission part, and an anode, which are sequentially arranged along a major direction of light emission.

6. The display panel of claim 1, wherein the connection transistor of each of the first to third pixels includes:

a semiconductor pattern including a source, a drain, and a channel; and a gate electrode disposed on the semiconductor pattern, wherein the second capacitor electrode of a corresponding pixel of the first to third pixels is disposed in a same layer as the gate electrode, the first capacitor electrode of the corresponding pixel is disposed under the second capacitor electrode of the corresponding pixel, and the third capacitor electrode of the corresponding pixel is disposed on the second capacitor electrode of the corresponding pixel.

7. A display panel comprising:

first and second pixel circuits each including a transistor and a capacitor; and first and second light emitting elements electrically connected to the first and second pixel circuits, respectively, wherein the first light emitting element is spaced apart from the capacitors of the first and second pixel circuits in a plan view, and the second light emitting element overlaps the capacitors of the first and second pixel circuits in the plan view, wherein the first light emitting element includes:

a cathode electrically connected to the first pixel circuit;

an anode electrically connected to a first power supply voltage line; and an emission part disposed between the cathode and the anode, wherein the transistor of the first pixel circuit includes:

a first transistor including a first gate electrode and a first semiconductor pattern electrically connected to the cathode of the first light emitting element and a second power supply voltage line;

a second transistor including a second gate electrode and a second semiconductor pattern electrically connected to the first gate electrode and a data line;

a third transistor including a third gate electrode and a third semiconductor pattern electrically connected to the second semiconductor pattern and a reference voltage line;

a fourth transistor including a fourth gate electrode and a fourth semiconductor pattern electrically connected to a first initialization voltage line;

a fifth transistor including a fifth gate electrode and a fifth semiconductor pattern electrically connected to the first semiconductor pattern and a second initialization voltage line;

a sixth transistor including a sixth gate electrode and a sixth semiconductor pattern electrically connected to the cathode and the first semiconductor pattern;

a seventh transistor including a seventh gate electrode and a seventh semiconductor pattern electrically connected to the first semiconductor pattern and the second power supply voltage line; and an eighth transistor including an eighth gate electrode electrically connected to the fifth gate electrode and an eighth semiconductor pattern electrically connected to the fifth semiconductor pattern and the sixth semiconductor pattern.

* * * * *